(12) United States Patent
Battlogg

(10) Patent No.: US 8,302,327 B2
(45) Date of Patent: Nov. 6, 2012

(54) VALVE FOR MAGNETORHEOLOGIC FLUIDS

(75) Inventor: Stefan Battlogg, St. Anton i. M. (AT)

(73) Assignee: Inventus Engineering GmbH, St. Anton i. M. (AT)

( * ) Notice: Subject to any disclaimer, the term of this patent is extended or adjusted under 35 U.S.C. 154(b) by 260 days.

(21) Appl. No.: 12/726,881

(22) Filed: Mar. 18, 2010

(65) Prior Publication Data

US 2010/0199519 A1 Aug. 12, 2010

Related U.S. Application Data

(63) Continuation of application No. PCT/EP2008/007929, filed on Sep. 19, 2008.

(30) Foreign Application Priority Data

Sep. 20, 2007 (DE) .......................... 10 2007 045 110

(51) Int. Cl.
*A43B 13/20* (2006.01)
*F16K 31/02* (2006.01)

(52) U.S. Cl. ......... 36/29; 251/65; 251/129.22; 137/909; 137/807; 280/281.1

(58) Field of Classification Search .................. 137/807, 137/832, 339, 909; 251/129.22, 65; 36/29; 280/281.1; 267/140.14, 140.15; 188/267, 188/267.1, 267.2; 192/21.5
See application file for complete search history.

(56) References Cited

U.S. PATENT DOCUMENTS

| | | | | |
|---|---|---|---|---|
| 3,010,471 A | * | 11/1961 | Gross | 137/909 |
| 3,406,704 A | * | 10/1968 | Van Fossen | 137/251.1 |
| 3,626,964 A | * | 12/1971 | Van Fossen | 137/831 |
| 5,362,027 A | | 11/1994 | Champaigne et al. | |
| 6,131,709 A | | 10/2000 | Jolly et al. | |

(Continued)

FOREIGN PATENT DOCUMENTS

DE 44 33 056 A1 3/1996

(Continued)

OTHER PUBLICATIONS

International Search Report of PCT/EP2008/007929, dated Feb. 4, 2009.

*Primary Examiner* — Eric Keasel
(74) *Attorney, Agent, or Firm* — Laurence A. Greenberg; Werner H. Stemer; Ralph E. Locher

(57) ABSTRACT

A valve for magnetorheological fluids is formed with a control duct in which the magnetic field of a magnetic device, consisting of a permanent magnet and coil, acts on the fluid. The viscosity of the fluid is directly proportional to the magnetic field strength, with the result that the flow resistance of the valve can be varied via the coil current. The respective control duct is arranged in the end-face region of the coil and runs radially with respect to the center line of the valve, with the result that high flux densities can be achieved in the control duct. A permanent magnet is arranged in the inner space of the coil and, even under currentless operating conditions, can close the valve up to a certain blocking pressure.

27 Claims, 17 Drawing Sheets

| U.S. PATENT DOCUMENTS | | | |
|---|---|---|---|
| 6,378,558 B1 * | 4/2002 | Pohl et al. | 137/807 |
| 6,419,058 B1 * | 7/2002 | Oliver et al. | 188/267.2 |
| 6,454,059 B1 * | 9/2002 | Lonbani et al. | 137/909 |
| 6,740,125 B2 | 5/2004 | Mosler | |
| 6,926,089 B2 * | 8/2005 | Goodson et al. | 137/909 |
| 2008/0155862 A1 | 7/2008 | Battlogg et al. | |

| FOREIGN PATENT DOCUMENTS | | |
|---|---|---|
| DE | 102 14 357 A1 | 10/2003 |
| DE | 103 37 516 A1 | 3/2005 |
| WO | 99/27273 A2 | 6/1999 |
| WO | 2007/014413 A1 | 2/2007 |

* cited by examiner

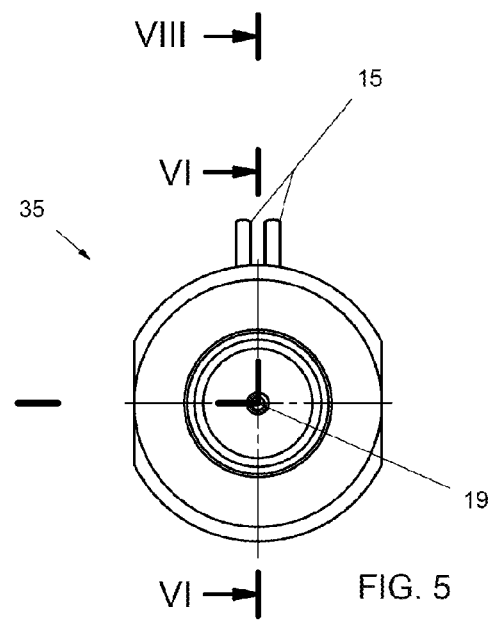
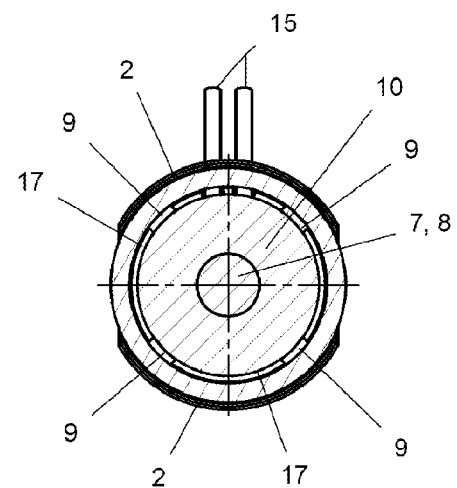
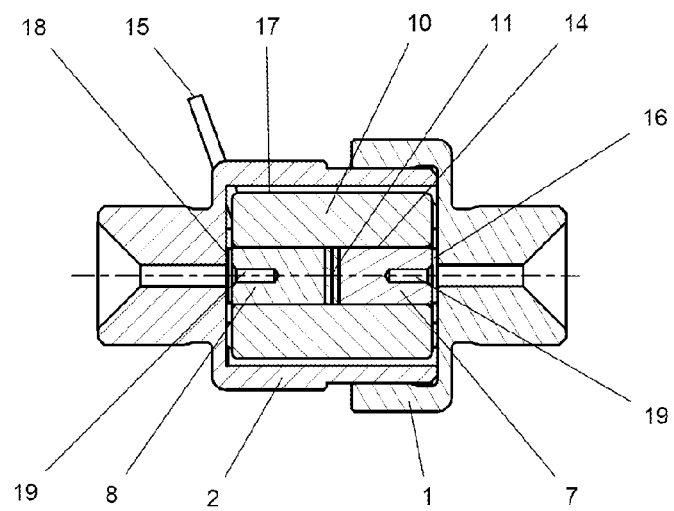
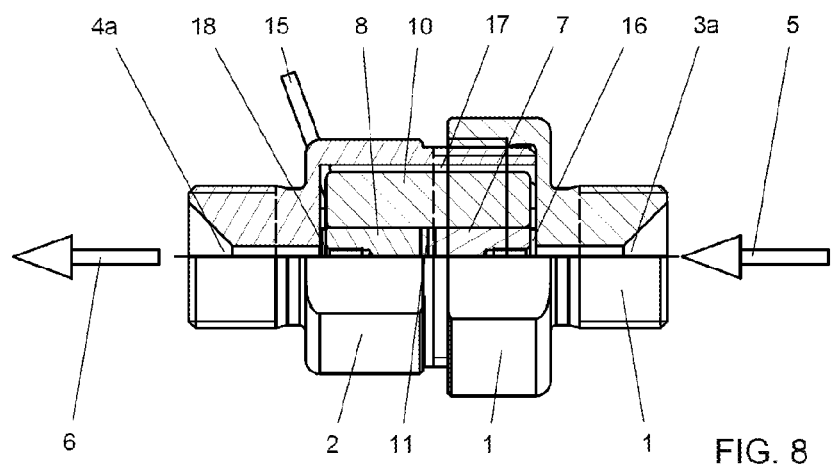

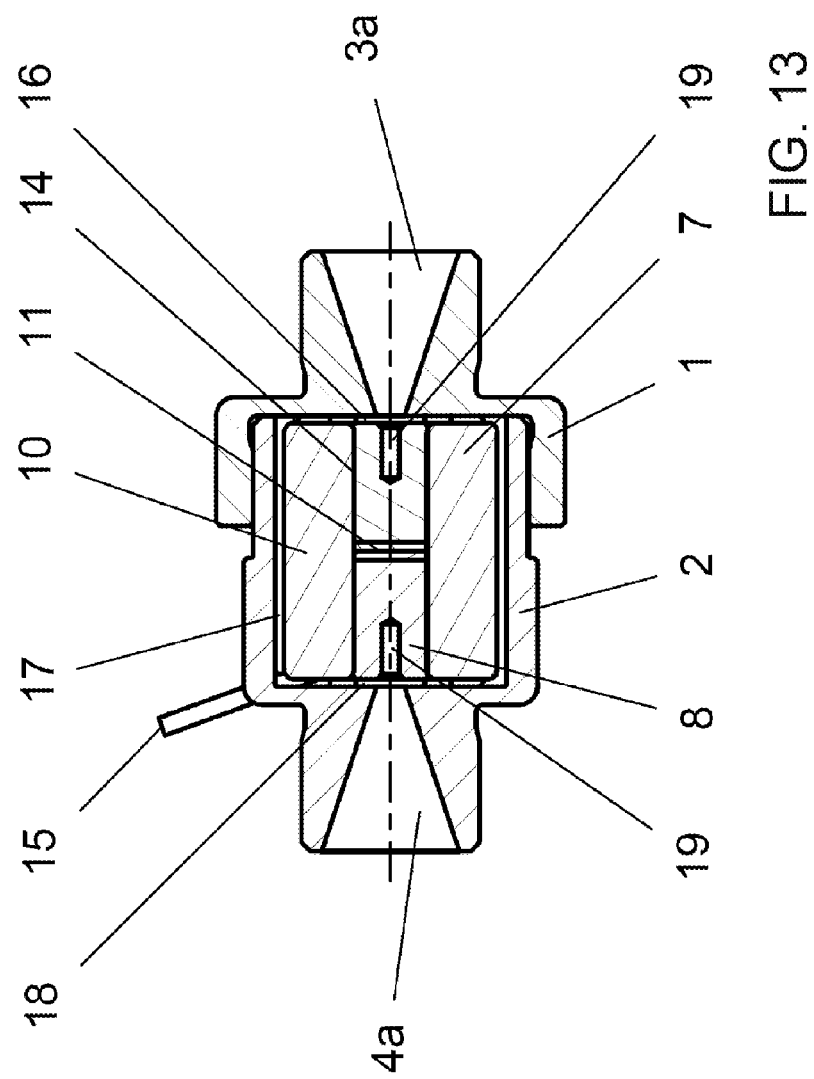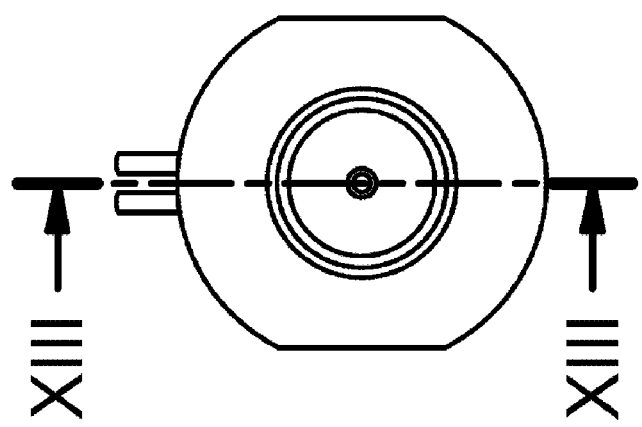

VALVE FOR MAGNETORHEOLOGIC FLUIDS

CROSS-REFERENCE TO RELATED APPLICATIONS

This application is a continuation-in-part of international patent application No. PCT/EP2008/007929 of Sep. 19, 2008 and claims the international priority of German patent application DE 10 2007 045 110 of Sep. 20, 2007. Reference is had to these earlier applications and they are incorporated by reference in their entirety.

BACKGROUND OF THE INVENTION

Field of the Invention

The subject of the invention is a valve for magnetorheological fluids, the valve having a duct for conducting the fluid through the valve and a coil through which current passes, the fluid having magnetizable particles which bring about a change in viscosity or a change in the flow resistance of the fluid, depending on the application of current to the coil, and which open or close the duct, a permanent magnet being arranged in an inner space of the coil through which current passes, and, furthermore, the duct partially being arranged in the end-face region of the coil through which current passes and partially extending over the radial outer circumference of the coil as an annular duct.

Magnetorheological fluids are variable/controllable liquids which consist, for example, of a fluid, in particular of a silicone oil or of another liquid, into which magnetizable particles corresponding to the liquid are suspended. Such magnetically active particles may consist, for example, of carbonyl iron powder.

The carbonyl iron powder is suspended in the liquid in the form of very small particles in the micrometer range.

Such magnetorheological valves have become known in many different embodiments. A first known embodiment is the subject of DE 103 37 516 A1. This is a valve arrangement for regulating the flow behavior of a magneto-rheological fluid, and the valve described there is distinguished in that the control duct for conducting the liquid through the control valve is arranged radially in the inner space of a coil through which current passes. When the coil is made live, the control duct arranged in the radial inner space is closed as a result of the current flux which occurs. The closing action takes place in that the magnetizable particles in the fluid form chains in the magnetic field, and a change in viscosity of the fluid thereby takes place. The previously low-viscosity fluid changes to a very highly viscous fluid, thus greatly increasing the flow resistance in the control duct. The valve is consequently virtually closed. The disadvantage of the known arrangement, however, is that, because the control duct is arranged radially inward in the inner space of the coil through which the magnetic flux passes, pronounced leakage fluxes (and non-influenceable magnetic fields) are to be taken into account when a permanent magnet is additionally used, as the publication mentioned describes. The publication does not describe exactly where the permanent magnet is to be arranged and describes only the possibility that the permanent magnet is to be arranged in the region radially outside the coil through which current passes, or in the inner space. If the permanent magnet is arranged in the radially outer region of the coil through which current passes, there is the disadvantage that a largely dimensioned permanent magnet is required in order to achieve an appropriate control flow in the radial inner space of the coil through which current passes. Moreover, a multipart magnetically conductive housing is required so that the permanent magnet can be mounted at all. The housing halves also ought not to be connected directly to one another, since the magnetic field of the permanent magnet is otherwise closed via the connection and the desired magnetic/valve action does not occur or occurs deficiently. A complicated three-part design would be necessary for this purpose.

If, by contrast, the permanent magnet is arranged in the inner space of the coil through which current passes (and directly next to the control duct), there is the disadvantage that high leakage fluxes are to be expected there, since the permanent magnet acts directly on the control duct bearing against it, regardless of whether current passes through the coil or not. In the case of a permanent magnet which always has to have two poles, part of the field is always closed directly from one pole to the other pole. If magnetorheological fluid flows in this region, as is the case in DE 103 37 516 A1, it is influenced. A high electrical power for actuating this control valve and a correspondingly large energy source are therefore required, because it is only by applying a correspondingly high current to the coil that the magnetic field of the permanent magnet at the control duct can be reduced and therefore a corresponding change in viscosity of the liquid is afforded. A complete cancellation of the magnetic field of the permanent magnet is not possible when the control duct is directly adjacent to the permanent magnet. However, on account of the leakage fluxes which are always acting, the change in viscosity of the liquid in the open state of the valve is low, as compared with its closed state.

Overall, therefore, in the publication mentioned there is the disadvantage that only a small change in viscosity by the valve can be achieved by means of a relatively largely dimensioned current source.

The subjects of DE 201 03 782 U1, of DE 299 13 326 U1 and of DE 198 20 569 A1 have disclosed valves for magnetorheological fluids which, however, operate with moving parts. On the one hand, movable diaphragms are used and, on the other hand (DE 198 20 569 A1), movable actuators are also employed. With such movable parts, however, there is the disadvantage that operating reliability is not afforded, since the parts movable with respect to one another suffer wear, become brittle, jam or lose their sealing action. A rapid switching of the valve is not possible, since the movable parts execute a stroke and are subject to mass inertia.

Although the subject of DE 44 33 056 A1 disclosed that a vibration damper is equipped with permanent magnets and the fluid duct is arranged in the region radially outside the coil through which current passes, the disadvantage of the arrangement again, however, is that the arrangement is formed in the region of a displaceably designed piston and the supply of current has to take place via the movable piston rod. In the publication mentioned, FIG. 2 shows a permanent magnet arranged in the inner space of the coil through which current passes. However, the control duct is arranged in the region radially outside the coil through which current passes, and there is therefore the disadvantage that a relatively high coil current is necessary in order to apply a correspondingly active magnetic field in this region. This is because the control duct is arranged in the radial outer region and consequently has a large cross-sectional area or large volume. It is therefore extremely difficult to generate a control flux field strength, critical for the effectiveness of the valve, on the radial outer circumference by means of a relatively low coil current, since the core surface at the permanent magnet or under the coil has a highly unfavorable behavior in relation to the magnetic field transition surface in the control duct. The core region, which is small in area, is magnetically saturated rapidly, whereas a low field strength occurs for the control duct transition region which has a much larger area. The smaller the diameter of the valve becomes, the more unfavorable the flux line profile becomes in this design.

A comparable set-up is described as a valve in U.S. Pat. No. 5,362,027. Instead of a displaceable piston, the unit has a core (core assembly) which is formed from a coil, pole pieces, a permanent magnet and pole caps (cap).

It is expressly pointed out here, that the pole caps and the opposite pipe segments (upper section, lower section) must consist of a non-magnetic material, in order to bunch the magnetic flux in a narrow part region of the control duct (flux working gap). This part region of the control duct runs axially and the magnetic flux lines in this part region run radially with respect to the throughflow direction of the valve.

The restrictions of such a set-up which are described above also apply accordingly here: owing to the unfavorable area ratios between the cross-sectional area of the magnet and the throughflow gap cross section, the maximum achievable field strength in the control duct is relatively low. Favorable area ratios can be achieved only by means of large magnet diameters, along with relatively small gap cross sections through which the magnetic field flows, thus making it difficult to miniaturize such a set-up. Basically, in the case of an axially running control duct, a high blocking pressure cannot be achieved due to the relatively low field strengths in the control duct or due to the fact that the control duct length is small because of the small throughflow gap area. Moreover, an axially running control duct places stringent requirements upon manufacturing tolerance, since even minor deviations in the gap height have major effects on the valve properties (increase or decrease of the cross-sectional area).

BRIEF SUMMARY OF THE INVENTION

The primarily important features of a valve according to the invention are high achievable field strengths in the control duct, along with a relatively small construction space, thus simplifying the miniaturization of such valves, and a very low energy demand, as compared with valves according to the prior art. Moreover, the below-described set-up of such a valve is distinguished by a simple and robust design.

The object on which the invention is based, therefore, is, proceeding from DE 103 37 516 A1 and from U.S. Pat. No. 5,362,027, to develop a magnetorheological valve of the type initially mentioned so that a high switching efficiency is achieved by means of a relatively low coil current.

The term "switching efficiency" is understood in this context to mean that high viscosity change is afforded with a valve which is in the open state, as compared with the same valve which is in the closed state.

The set object is achieved by means of the technical teaching of the independent claims.

A primarily important feature of the invention is that the respective control duct is arranged in the end face region of the coil and runs radially outward. The control duct merges at the outer end into the annular duct which surrounds the coil and which connects the two control ducts axially. The flow resistance of the valve can be varied via the magnetic field of the permanent magnet and the coil, which magnetic field can act on the magnetorheological fluid in the control ducts.

The technical teaching given achieves the substantial advantage that a high switching efficiency of the valve is now achieved by means of a very low coil current. This is because, with the valve closed, only the magnetic flux of the permanent magnet arranged in the inner space acts and consequently generates a high blocking flux on the control ducts arranged on the end face, so that a blocking flux of high flux density is generated in this region. This is because the clear width of the pole face is equal to the clear width of the transition surface in the control duct. The closed state of the valve is therefore achieved solely as a result of the magnetic action of the permanent magnet, the coil being currentless.

There is therefore the essential advantage that only low energy has to be used for activating the valve, because the closed state of the valve is obtained solely by means of the permanent magnet.

Only when the valve is to be controlled into an open state is there provision for current to pass briefly through the coil, in order thereby to cancel the magnetic flux of the permanent magnet and to reduce the magnetic flux in the respective control duct arranged on the end face, so that said magnetic flux virtually disappears in the region of the control duct arranged on the end face, and a free throughflow of the liquid is possible in this region.

Consequently, on the one hand, high switching efficiencies of the valve are achieved, that is to say high viscosity changes of the magnetorheological fluid can be achieved, and, on the other hand, it is possible for current to be applied to the coil in the switching state only.

This affords the essential advantage that it is sufficient to use a portable current source of relatively small dimensioning, thus appreciably improving the possibilities for the use of the valve according to the invention.

It is thus possible, for the first time, to install such a valve in portable arrangements, such as, for example, in a ski shoe, a snowboard shoe, a cross-country ski shoe, a sports shoe for running, the saddle support of a bicycle or other movable transport means which do not have a specific power supply.

The essential advantage of the invention is based here upon the fact that it is sufficient, for example, for a valve of the type of construction according to the invention to use as current source 2 1.5 volt batteries of AA size, and in this case pressures in the range from 10 to 15 bar can be controlled perfectly. In this case, in the open state, a pressure of, for example, 1 bar prevails, while, in the closing state of the valve, there is a pressure in the range of 10 to 30 bar.

The blocking pressure of the present valve can be increased markedly if the polarity of the coil current is reversed, so that the two magnetic fields of the permanent magnet and the coil are mutually superposed and intensified in the control duct. The current strength therefore decides the extent to which the coil field influences the field of the permanent magnet, and the current direction decides whether the field of the permanent magnet is intensified or attenuated.

In a development of the present invention, there is provision for a field concentrator, as it is known, to be arranged in the control duct. This is achieved in that in each case an axial bore is arranged in the region of the iron core as arranged in each case on the end face and is arranged as a blind bore in the respective iron core. This blind bore is arranged exactly opposite the entry-side and exit-side duct and therefore also exactly opposite the center of the control duct.

The pole face of the magnet is thus larger than the transition surface in the control duct. What is achieved thereby is that a high field concentration does not take place in this center of the control duct in the region of the entry duct and exit duct, but, instead, this field concentration is shifted and concentrated further radially outward, specifically exactly into that region of the control duct in which the liquid flows, thus greatly increasing the effectiveness of the magnetic flux in this region. The combination of flow diversion, such as, for example, when the inflow is diverted from axial to radial, and of the magnetic field concentrated in this region further increases the efficiency or the maximum blocking pressure.

In all the embodiments, it is always presupposed that the two housing halves of the valve are designed to be magnetically conductive and consist of a corresponding ferromagnetic material, while the coil through which current passes has in its inner space in each case iron cores which are assigned axially to one another and in the middle region of which the permanent magnet is arranged. The polarity of the permanent magnet is formed so that it is generated axially. It is important that the permanent magnet has no direct contact with the flow duct or with the fluid and is spaced apart from these.

In another refinement of the invention, there may be provision for the iron cores even to be dispensed with and also for arranging a single permanent magnet of approximately cylindrical design instead of the iron cores and the permanent magnet arranged centrally between the iron cores.

Moreover, the clear cross section of the respective control duct, which is arranged on the end face in the two housing halves located opposite one another, is dimensioned in that the two housing halves are provided in each case with an internal and an external thread and can be screwed to one another. Thus, by the two housing halves being screwed together correspondingly, the clear width of the respective control duct can be set continuously. This is an essential advantage, as compared with the prior art, because, in the prior art, a continuous setting of the clear width of the control duct was not afforded.

The connection piece or fluid line having any desired cross section may narrow, upon entry into the valve, upstream of the control duct.

A series of further refinements of the subject of the invention are described below.

1. Heating (Warming of the Liquid):

It was found that, when the magnetic field is switched off, the counterforce changes (proportionally) to the viscosity change of the basic liquid.

With the magnetic field switched on, the counterforce changes proportionally to the viscosity change of the basic liquid, with the magnetorheological effect superposed upon it.

In an operating temperature range of, for example, −40 to 90° C., there is the problem that a large change in the flow resistance of the valve may be caused solely by the thermally induced viscosity change of the basic liquid.

Solution:

According to the invention, then, to solve this problem, it is proposed that the magnetorheological fluid be warmed by current being applied to the electrical coil. The coil or the valve unit may in this case be warmed, for example, up to 100° C. The liquid located in the valve is in this case warmed (by flow or statically).

In a further version, by the heating element being suitably connected to a temperature-dependent resistor, such as NTC or PTC (material with a negative or positive temperature coefficient), the current through the heating element can be adapted automatically to the temperature. For example, a PTC resistor may be connected in series as a discrete component to the resistance wire, in order to regulate the heating power via the current.

A further extension stage is the regulation of the current via one or more temperature sensors, such as, for example, PT100 or thermocouples, regulating elements and amplifiers. This makes it possible to use a local temperature or else the weighed average of various temperatures as an input parameter for current regulation.

Consequently, in use in ski shoes, the foot (space) can be heated, which is ideal.

2. Pressure or Volume Flow Measurement in the Valve:

2.1 Pressure Measurement

The pressure changes upstream/downstream of the valve, depending on the magnetic field. The temperature and other factors (line quality, etc.) influence the pressure.

The aim is to achieve defined pressure states or the possibility of exact pressure determination (independently of external influences, viscosity fluctuations, etc.).

For this purpose, there is provision for the signals necessary for regulating the counterforce/counterpressure to be obtained, inter alia, from sensors directly on the control duct. The sensor may be mounted in the system, as desired, depending on the application and sensor type.

The force may also be calculated, for example, from the pressure of the medium. Pressure sensors may, for example, be mounted in the pipe. For specific applications, it is advantageous to design the sensor as a differential pressure sensor "P" which measures the pressure difference between the inflow and the outflow side.

Above all when movements are controlled via the valve, displacement-recording/position-determining sensors are advantageous. Such sensors may be designed as variable resistors (potentiometric sensors) or optical encoders/displacement transducers. However, capacitive or inductive sensors may also be envisaged.

2.2 Volume Flow Measurement

Instead of the pressure sensor, a sensor for measuring the throughflow (volume flow) may also be integrated into the valve. The valve can consequently be controlled/regulated even better.

3. Electrical Activation of the Valve

There is a need to control or regulate the valve.

3.1 Simple Electrical Activation

When the switch is closed, a current can flow from the supply, via a coil, to ground. The current directly determines the strength of the magnetic field via the coil, and in the case of pulsed activation (for example, PWM) the coil current can be varied independently of the supply voltage.

In the simplest version, the switch may be a mechanical switch/touch contact, and is it advantageous to use a transistor. However, other possibilities, such as, for example, a relay or else special forms of the transistor (MOSFET, IGBT), may also be envisaged. The switch may, inter alia, also be between the coil and GND.

A simple set-up variant is to limit the current via a resistor. Depending on the application, the internal resistance of the current supply may even be sufficient. If the resistor is designed to be variable (potentiometer), then the coil current can also be varied. As compared with the variant activated in a pulsed manner, here, however, the power loss may quickly reach very high values.

The resistor is also intended to symbolize the possibility of current measurement. This may take place not only by measurement via a low-impedance resistor (shunt), but also by other methods, such as, for example, a current transformer or an integrated solution (current measuring IC, Hall sensor). Current measurement may take place at any desired location in the circuit and serves for regulation.

A diode is designed as a recovery diode which enables the coil to continue to drive current after the opening of the switch. The diode may likewise be replaced by a switch which is operated in push/pull with the master switch.

In addition to the simple possibility of control, the valve or the control may be equipped with various sensors which make it possible to set up a control loop. Depending on the intended use, for example, pressure, force, displacement, temperature, speed or acceleration sensors may be used. The combination of these or of other sensors may also be envisaged.

3.2 Activation Via a Full Bridge

An alternative version provides activation by means of a full bridge (H-bridge). The coil can thus be activated in both directions, that is to say the polarity at the coil terminals can be changed. This makes it possible, for example, to intensify or to attenuate a permanent magnet in a magnetic circuit of the coil.

The location of current measurement may vary, but, for example, it is advantageous to carry out measurement in the GND branch in order to obtain a GND-referenced measurement signal. In addition to the simple possibility of control, the valve or the control may be equipped with various sensors which make it possible to set up a control loop. Depending on the intended use, for example, pressure, force, displacement, temperature, speed or acceleration sensors may be used. The combination of these or of other sensors may also be envisaged.

4. Heat Accumulator Oil as Basic Liquid:

The magnetorheological fluid based on oil with carbonyl iron powder feels "cold" to the foot in winter. The aim, instead, is to have "warm feet".

For this purpose, the invention provides for adopting a liquid with a high heat accumulator capacity instead of oil/silicone/glycol. This liquid is heated at home or on the car journey to the skiing area and serves thereafter as a heat accumulator and heating for the feet.

It is also conceivable to use latent heat accumulators, such as are already used in "pocket warmers". In this case, a substance is employed, which can store energy which is converted, as required, into heat on the ski run. (Utilization of the phase transition or chemical processes, such as, for example, the crystallization of salts).

5. Shock Absorber Applications:

Shock absorptions according to the prior art can be adjusted in a single stage, at most in two or three stages, and mostly by hand. According to the invention, continuous adjustment, preferably automatic adjustment, is to take place.

To achieve this object, the invention proposes that hydraulic valves according to the prior art (on/off valve) be replaced by the MRL valves according to the invention.

7. Fan Use

All MRL valves according to the present invention can be employed in head restraints, safety belts, seats and seat elements and the like. Devices of this type are likewise used in other vehicles, such as, for example, bicycles, in the front and rear wheel suspension, in the saddle support or the like. They are also employed in various sports appliances, such as running or ski shoes, etc.

The object is to develop an MRL valve according to the invention so that as great a spread as possible (force difference) is afforded, along with the smallest possible construction space and energy demand.

In the solution according to the invention, one or more disk or fan elements are/is mounted in the control ducts. The frictional surface is thereby increased. Use may consist of a plurality of axially positioned magnetically conductive strips (thin disks) which are spaced apart from one another by means of magnetically non-conductive webs. If the webs are designed to be thin, they may also be made from magnetically conductive material, since then only a very small part of the magnetic field flows through these webs. The magnetic field thus flows through the iron core to the first axial lamination, then further on, via the gap filled with MR liquid, to the next lamination, and so on and so forth as far as the housing half. The MR liquid enters in the middle of the lamination bundle and flows away radially.

The lamination bundle (fan) has, on the side facing the iron core, a tenon which serves for centering.

Preferably, these fans/disks are produced from a magnetically highly conductive material. It is also conceivable to produce these axial fans/disks from a poor magnetic conductor, although this increases the magnetic field strength required in order to maintain a specific magnetic flux in the magnetic circuit.

8. Retentivity

Valves according to the prior art can be designed with a permanent magnet so that they do not require any energy at a specific operating point. Any deviation from this operating point, whether it be an intensification or an attenuation of the magnetic field, in order to achieve a greater or lesser pressure difference requires energy. In many applications, however, a preferred operating point which is present for a major part of the operating time cannot be determined. This is the case, for example, with a valve which is as often completely open and completely closed.

Precisely in the case of a mobile application, such as, for example, a valve in a running shoe for setting the pronation or in the damper of a knee prosthesis (FIG. 28), where other settings and damping properties are required, depending on the wearer and the activity, optimization with respect to an operating point is not advantageous and the permanent energy demand is a considerable disadvantage.

In a valve according to the invention, this problem is solved in that the magnetic field can be generated permanently by means of a magnetic device consisting at least partially of hard-magnetic material. In this case, the magnetization of the hard-magnetic material may be varied permanently by means of at least one magnetic pulse from the coil, in order to vary permanently the magnetic field acting in the control duct and, consequently, the flow resistance of the valve.

In contrast to the prior art, where the magnetic field of the magnet can be varied by the magnetic field of the coil only as long as current flows in the coil, a valve according to the invention can permanently vary the magnetization of the magnetic device via magnetic pulses from the coil. As a result, for example, the magnetic properties of the magnetic device can be varied permanently by means of a single short pulse which requires energy only briefly. Energy is therefore required only in order to change the field strength in the control duct. The magnetic field generated by the magnetic device in the control duct acts without a supply of energy and maintains its field strength permanently, as long as it is not influenced by external circumstances, such as, for example, other magnetic fields, temperature influences or natural aging processes.

Preferably, the permanent magnetization of the hard-magnetic material can be set to any desired value between zero and retentivity by means of at least one magnetic pulse from the coil. In this case, preferably, the polarity of the magnetization may also be variable.

A dynamic magnetic field may be superposed upon this static magnetic field by means of the coil, without the permanent magnetization of the hard-magnetic material being varied as a result.

The term "permanent" means, in the context of this application, a period of time which is longer by a multiple than the duration of the magnetic pulse. In particular, periods of time of at least several seconds, minutes, hours, days or longer are meant by this. However, the set magnetization does not expressly have to remain the same forever, since it may be subject to natural fluctuations and attenuation phenomena.

In contrast to this, the time duration of the magnetic pulse required for variation is relatively short. The time duration of the, in particular, single brief pulse in this case preferably lies below 1 minute, preferably below 1 second and, in particular, below 10 milliseconds. The intensity of magnetization depends on the strength of the magnetic pulse, but not on the length of the magnetic pulse.

A material is deemed to be hard-magnetic when its coercivity lies above 1 kA/m and, in particular, above 10 kA/m. The hard-magnetic material preferably has a coercivity lower than 1500 kA/m, preferably lower than 500 kA/m and, particularly preferably, lower than 200 kA/m. A suitable material is, for example, AlNiCo or a magnetic steel alloy, such as, for example, FeCrCo, FeCoVCr and CuNiFe, or another material having comparable magnetic properties. Advantages of AlNiCo are the profile of the demagnetization curve, the high temperature stability and the good chemical properties in relation to other conventional magnetic materials.

The hard-magnetic material, on the one hand, must be capable of generating a high magnetic field strength in the existing magnetic circuit, while, on the other hand, the energy required for magnetic reversal should not be too great. It is conceivable to manufacture only part of a magnetic device from hard-magnetic material and to manufacture the rest from a material having low magnetic resistance (reluctance) and a high saturation flux density. Advantageously, this part of the magnetic device is arranged in the coil or in its immediate vicinity, since the coil field for magnetic reversal is the strongest there and can also be controlled best there.

It is, however, also possible to manufacture the entire magnetic device from hard-magnetic material, in which case relatively more material is available for generating the field, or the magnetic requirements to be satisfied by the material become lower.

The generatable field strength of the coil is preferably sufficient to magnetize the hard-magnetic parts of the magnetic device up to their magnetic saturation.

Preferably, at least one capacitor device and at least one energy accumulator, in particular a battery, are provided, in order to make available the energy for generating at least one magnetic pulse. As a result, the valve also possesses excellent emergency running properties, for example if the energy supply collapses or the control fails. A defined operating state of the valve can be ensured by means of a defined current pulse.

In all refinements, preferably, at least one control and/or check device is provided, in order to output magnetic pulses from the coil in a controlled and/or regulated manner.

To detect the actual data and/or the position of the valve, at least one sensor device may be provided. Sensors for the direct or indirect determination of the magnetization of the magnetic device may be used. These sensors or their measurement results may be employed by a control or regulating device in order to determine the strength of the magnetic pulses to be generated.

Preferably at least one resonant circuit device is provided, so that a damped magnetic alternating field for demagnetization can be generated. The demagnetization of the hard-magnetic material may take place via a damped magnetic alternating field or via at least one defined magnetic pulse. It is possible, before any change in magnetization, first to demagnetize the magnetic device and then to magnetize it anew.

The inventive subject of the present invention may be gathered not only from the subject matter of the individual patent claims, but also from the combination of the individual patent claims with one another.

All the particulars and features, in particular the three-dimensional design illustrated in the drawings, which are disclosed in the documents, including the abstract, are claimed as essential to the invention, insofar as they are novel, as compared with the prior art, individually or in combination.

The invention is explained in more detail below by means of drawings which illustrate only one way of implementation. At the same time, further features essential to the invention and advantages of the invention may be gathered from the drawings and their description.

BRIEF DESCRIPTION OF THE SEVERAL VIEWS OF THE DRAWING

In the drawings:

FIG. 5 shows an end view of the housing

FIG. 6 shows a cross section along the line VI in FIG. 5

FIG. 7 shows a section along the line VII in FIG. 4

FIG. 8 shows a section along the line VIII in FIG. 5

FIG. 13 shows a cross section along the line XIII in FIG. 14 with a further exemplary embodiment having nozzle-shaped contraction FIG. 14 shows a top view of the entry-side end face of the further exemplary embodiment according to FIG. 13

DESCRIPTION OF THE INVENTION

Figure 1:
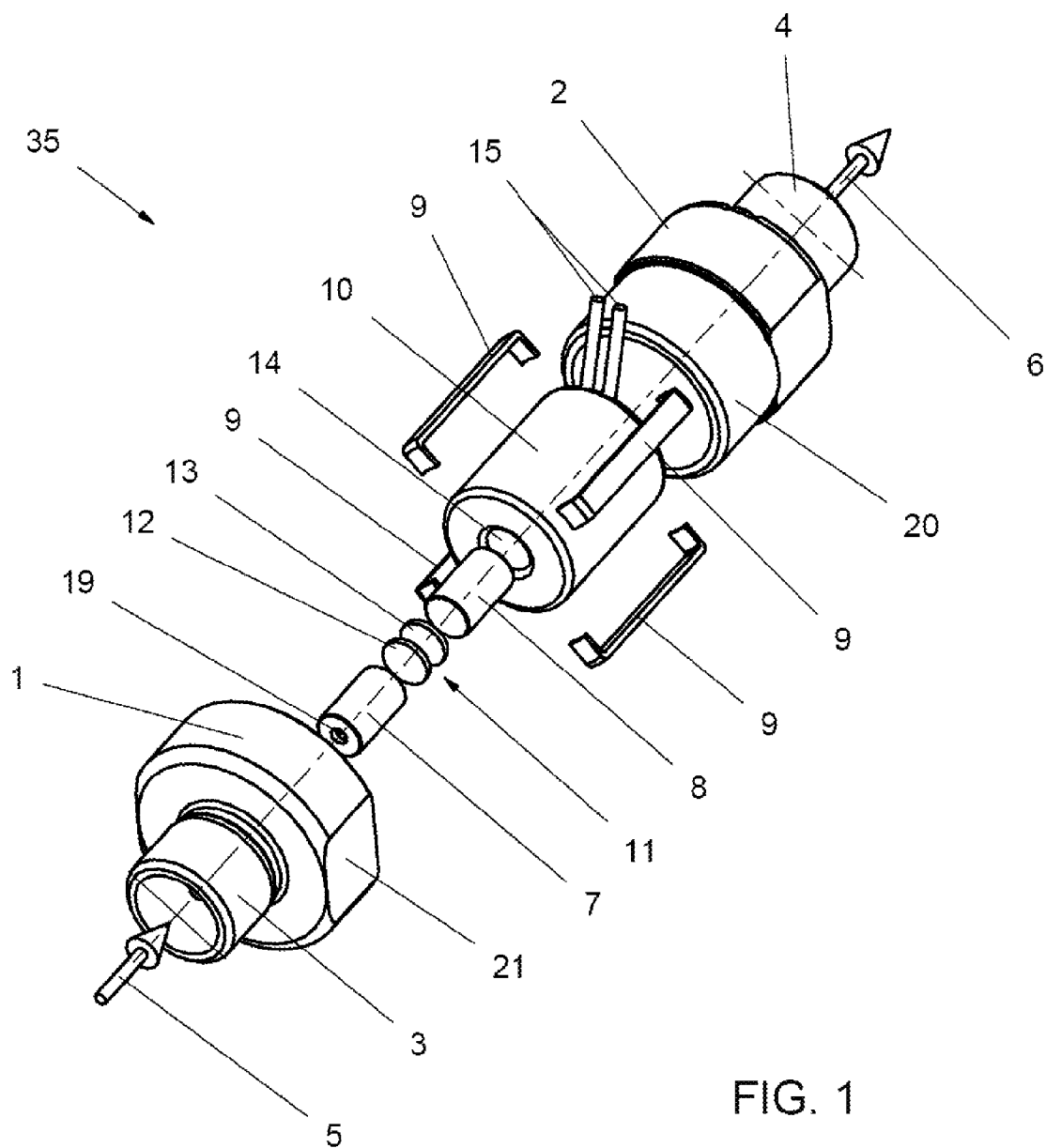
FIG. 1 shows, exploded in perspective, an illustration of a valve according to the invention
Figure 2:
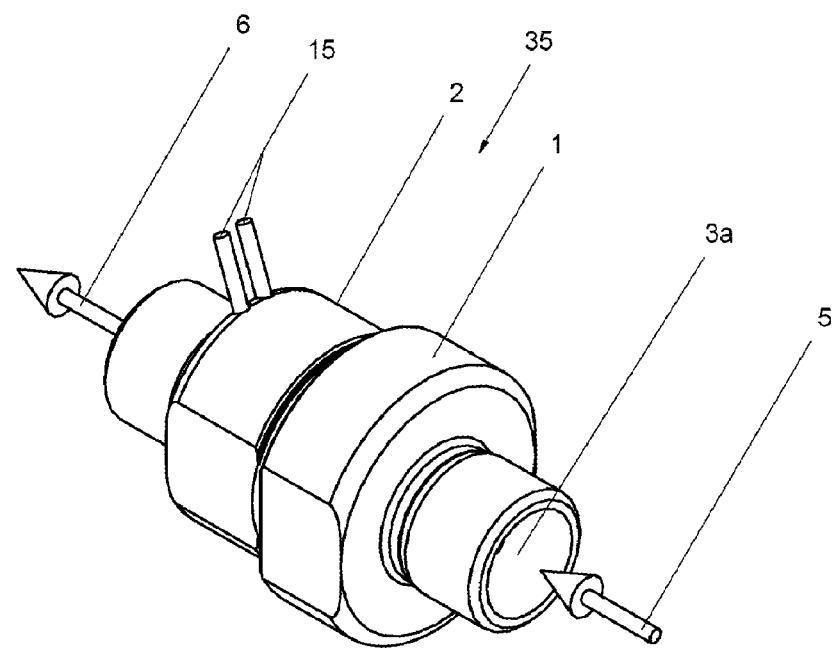
FIG. 2 shows a perspective illustration of the assembled housing
Figure 3:
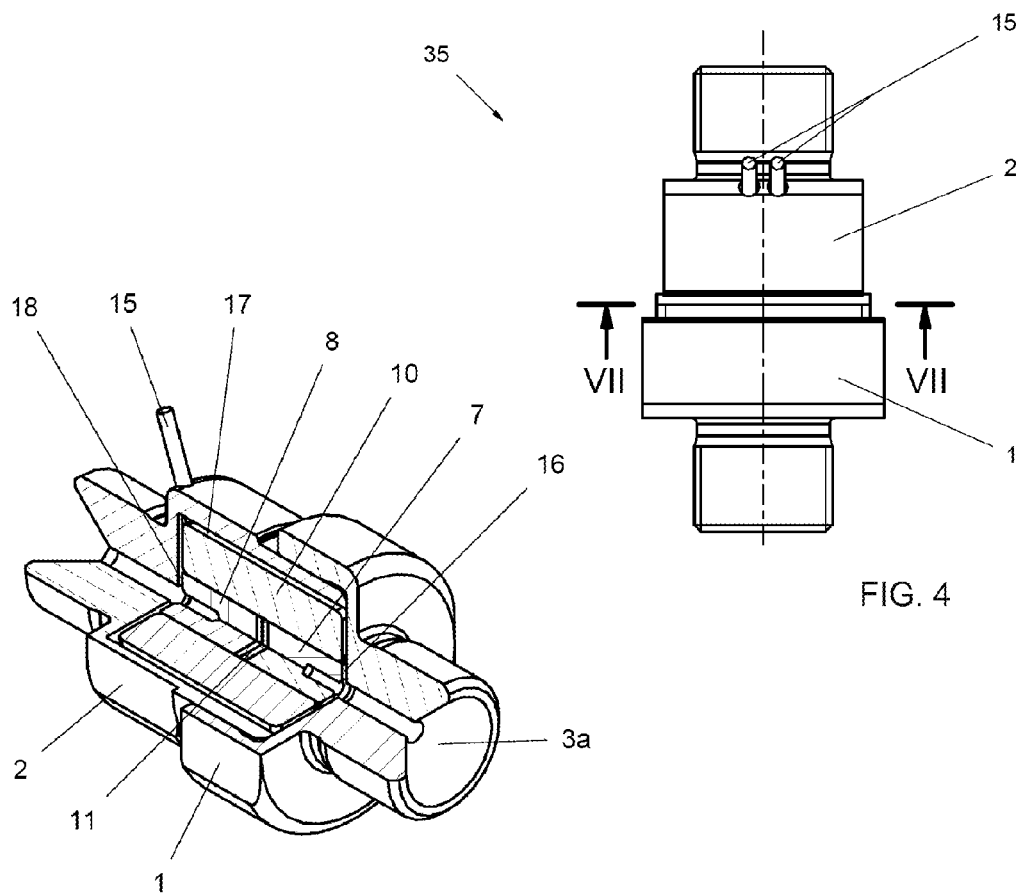
FIG. 3 shows a quarter section of the housing according to FIG. 2
Figure 4:
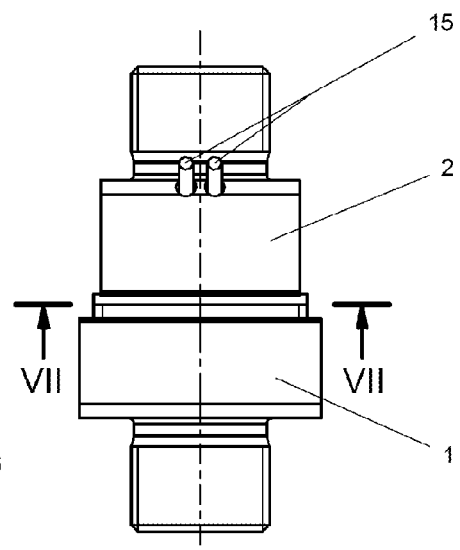
FIG. 4 shows a side view of the housing according to FIG. 2

In the following description, it is presupposed that the entire valve is constructed rotationally symmetrically about its longitudinal axis. Furthermore, it is also essentially symmetrical with respect to its transverse mid-axis. It is therefore sufficient to describe only the components and their arrangement on one valve side, for example the entry side, because the other valve side, for example the exit side, is of exactly identical design.

FIGS. 1 to 4 illustrate diagrammatically the housing of the control valve 35, which housing consists of two magnetically conductive housing halves 1, 2 which can be screwed to one another. In the exemplary embodiment, the housing half 2 has an external thread 20 which can be screwed into an assigned internal thread 21 on the housing half 1. The clear cross section of the control duct 16, also to be described later, can thereby be set continuously.

Formed on the housing half 1 is a connection piece 3 forming an entry duct 3a, via which, for example, the magnetorheological fluid flows in in the direction of the arrow 5.

Similarly, the housing half 2 has a connection piece 4 forming an outlet duct 4a, via which the liquid flows out again in the direction of the arrow 6.

It will be appreciated that the control valve 35 shown here can be operated in both directions. In this case, the directions of the arrows 5, 6 would be reversed, and the exit orifice would then be the entry orifice, and vice versa.

Here, in each case, an iron core 7, 8 is arranged in the inner space of each housing half 1, 2 and is arranged, in turn, in the inner bore 14 of a coil 10 through which current passes.

Between the two iron cores 7, 8, which are preferably of cylindrical design, is arranged a permanent magnet 11 which is of disk-shaped design. For the sake of a clearer description, the two poles of the permanent magnet 11 can be illustrated separately from one another, so that a north pole 12 and a south pole 13 are seen in FIG. 1, although the two poles 12, 13 form a unitary permanent magnet.

Furthermore, in the region radially outside the coil 10, spacers 9 are present which are arranged so as to be distributed uniformly on the circumference and have an approximately U-shaped profile. They are supported with their bent ends in each case on the inner surfaces of the two housing halves 1, 2, in order thereby to form an exactly defined control duct 16, 18. They therefore penetrate through the annular duct 17.

The spacers 9 are preferably designed to be bendable and consist of a magnetically non-conductive material, for example a plastic material or an aluminum material.

FIG. 1 also shows the coil terminals 15 for applying current to the coil 10.

The entire liquid duct in the valve region is delimited and defined inwardly by the outer circumference of the coil 10 and the end faces of the iron cores 7 and 8, and outwardly by the inner circumference of the two housing halves 1, 2.

According to FIGS. 6 and 8, the flow of the magnetorheological fluid takes place in that the liquid flows into the housing half 1 in the direction of the arrow 5 via the entry duct 3a, is distributed in the form of a disk on the inner circumference of this housing half and is diverted perpendicularly thereto into a control duct 16 arranged on the end face. The control duct 16 is therefore to be considered, in a top view, approximately as a disk-shaped space which widens outwardly in the radial direction around the central entry duct 3a. The control operations to be described later take place in this disk-shaped space.

The control duct 16 is oriented with its longitudinal axis in the radial direction and the radially outer end of the control duct 16 has adjoining it an annular duct 17 which surrounds the radial outer circumference of the coil 10. The annular duct 17 therefore extends over the entire outer circumference of the coil 10 and surrounds the latter as a liquid jacket. The coil 10 is consequently cooled when current flows through it, thus causing the electrical resistance of the coil to be kept constant and therefore to be relatively independent of temperature.

After the flow has passed through the annular duct, this annular duct 17 is united again on the other side into a further control duct 18. The explanations given above for the control duct 16 therefore apply in a similar way to the control duct 18.

It becomes clear from the above description that the control valve 35 is designed exactly symmetrically with respect to the longitudinal transverse line, that is to say the control ducts 16, 18 are designed exactly identically and are controlled and influenced via the same control elements. It is therefore sufficient to describe only the action of the liquid in a single control duct, for example the control duct 16, in order also to describe the action in the control duct 18.

It is important that an axial bore 19, which acts as a flux line concentrator, is arranged in each case on the end face in the region of the iron cores 7, 8 assigned to one another and arranged in alignment with one another. This is also described later with reference to FIG. 11. What is achieved thereby is that the density of the flux lines is lowered in this region.

Figure 10:
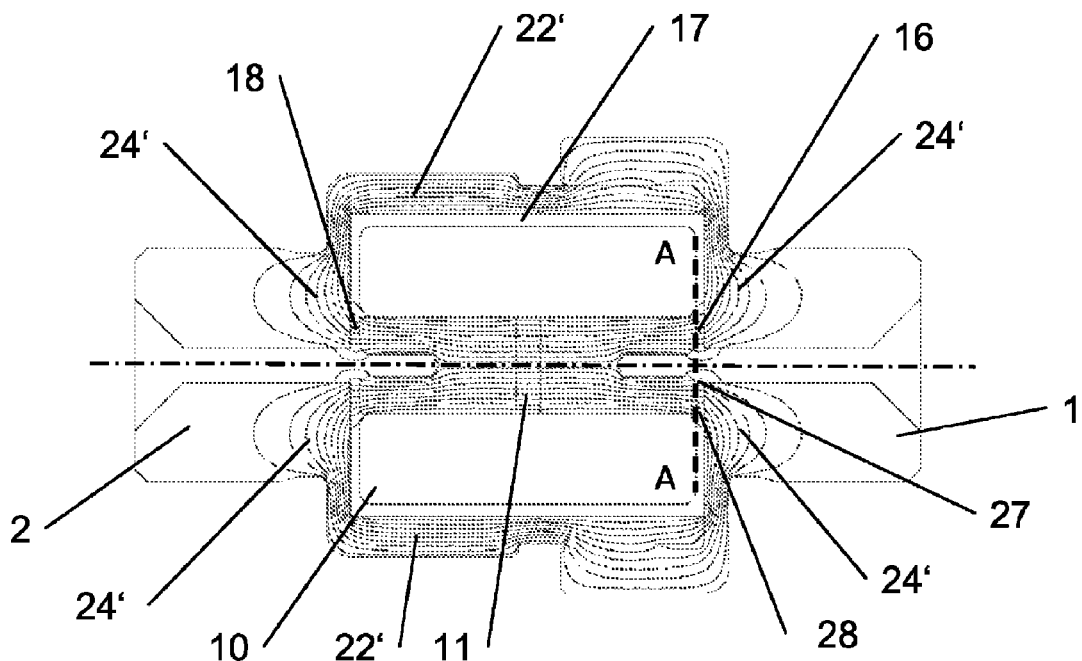
FIG. 10 shows the field flux, as compared with FIG. 9, when the valve is closed
Figure 9:
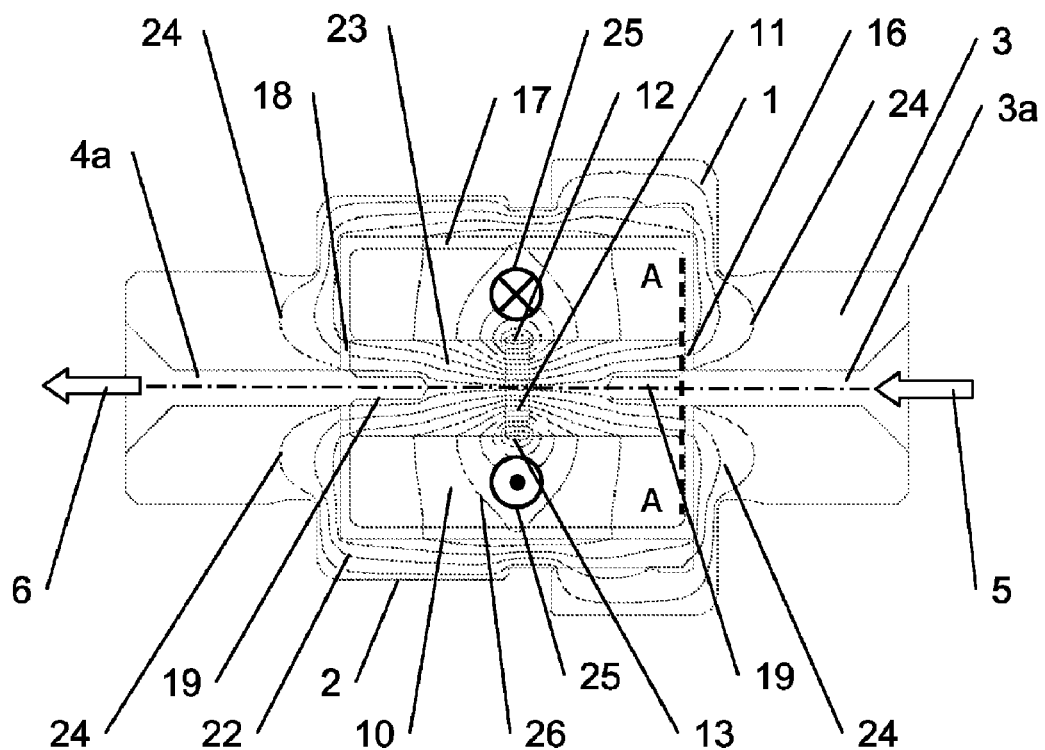
FIG. 9 shows diagrammatically the illustration of the field flux when the valve is open

With reference to FIGS. 9 and 10, then, the action of the flux lines on the open and the closed valve state is explained.

FIG. 9 illustrates that the coil 10 is live, so that the magnetic flux which is generated by the coil 10 and generates an outer magnetic flux 22 and an inner magnetic flux 23 counteracts the magnetic flux of the permanent magnet 11, so that this magnetic flux is virtually canceled. This arises on account of the low density of the magnetic flux lines in FIG. 9. It consequently becomes clear that, by the magnetic flux in the region of the control ducts 16, 18 being canceled, the valve is switched to throughflow, because, in the region of the respective control ducts 16, 18, there is only a very low magnetic flux 24 which thus opens the control ducts 16, 18. The magnetic flux obstructing the flow of the fluid has therefore lapsed.

The magnetic flux 24 is only negligibly low, as may be gathered from the small number of flux lines of low field strength in FIG. 9 in the region of the control ducts 16, 18.

If, however, the current flux through the coil 10 is removed, the valve changes to the closing state, as illustrated in FIG. 10. It can be seen there that the magnetic flux 24' is then greatly increased in the region of the control ducts 16, 18 and, consequently, an effective interruption of the fluid stream takes place in this region. The viscosity of the fluid stream is increased to an extent such that a flow can virtually no longer be detected.

Figure 11:
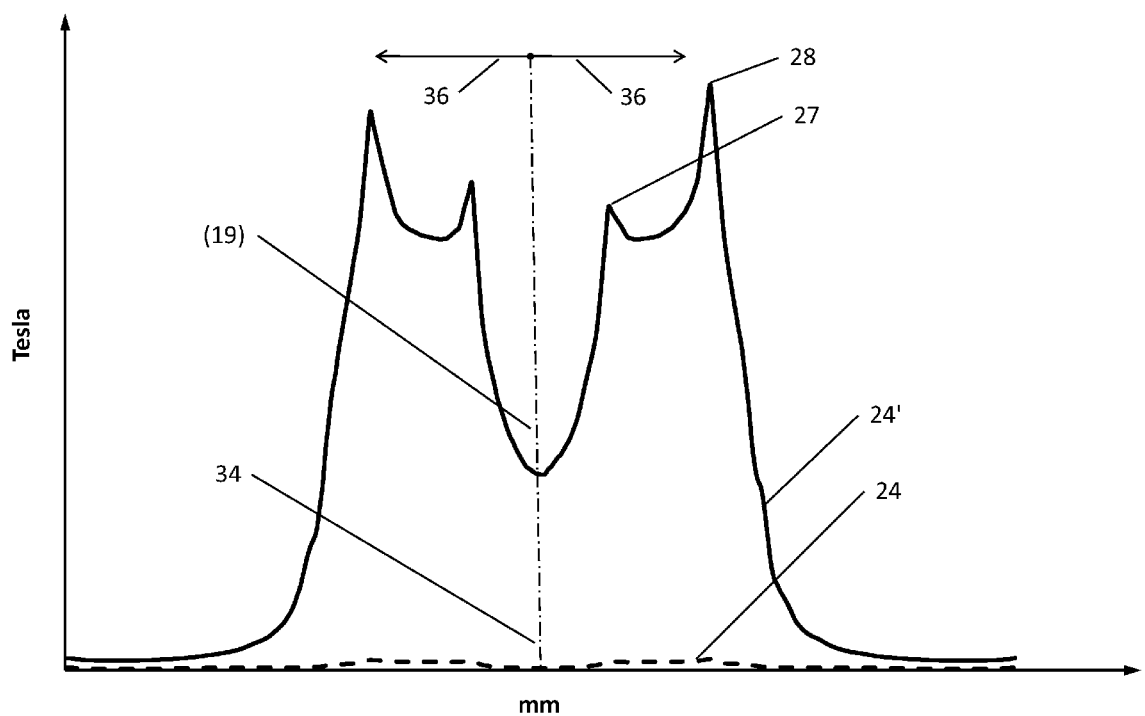
FIG. 11 shows a section through the control duct arranged on the end face, with an illustration of the magnetic flux in the open and in the closed state

This is also illustrated by means of FIG. 11 where a cross section through the control duct is illustrated, with an illustration of the magnetic flux 24, 24' active in the control duct. It can be seen that the magnetic flux 24 upon which the coil current is superposed is greatly reduced, and consequently the valve is switched into the open position, while the closing position is characterized in that the magnetic flux through the coil 10 is removed and only the magnetic flux 24' of the permanent magnet 11 acts. As a result, very high magnetic flux peaks are generated in the control duct, as can be seen at positions 27 and 28.

It is important that, on account of the axial bore 19 in the two iron cores 7, 8, a field concentration then takes place in the regions of the control duct 16, 18 which occur outside the center, and no longer in the center of said control duct. This is illustrated in FIG. 11.

According to FIG. 11, therefore, a reduction of the magnetic flux is brought about in the center region, in alignment in relation to the entry duct 3a and the exit duct 4a, so that the magnetic flux is shifted to a greater extent into the radially outer region, as seen from the center line 34. This is symbolized by the directions of the arrows 36. If the axial bores 19 were not present in the iron cores 7, 8, the magnetic field would be concentrated to a greater extent in the region of the center line 34. However, the entry and exit ducts 3a, 4a are located in this region, and it is difficult to control the flux in this central region. This would be possible only by means of substantially higher flux densities. Consequently, the fluid-active control is shifted into the radially outer region, as seen from the center of the entry and the exit duct 3a, 4a.

This is achieved in each case by means of an axial bore 19 arranged centrically opposite the entry and the exit duct 3a, 4a in the respective iron core 7, 8. The iron material is thus weakened magnetically in this centering region and loses its magnetic effectiveness. Of course, the axial bore could also be closed by means of a magnetically non-conductive material, for example a plastic plug.

FIG. 9 shows that, for the open position of the valve, the coil is acted upon with current in the direction 25 and thus counteracts the permanent magnetic field, thus resulting in only a low residual field 26. In contrast to FIG. 10, it is indicated that then, with the lapse of the coil magnetic field, a strong permanent magnetic field arises, and a strong magnetic flux 24' is thereby generated in the region of the control ducts 16, 18 lying opposite one another.

The outer magnetic field 22' is therefore generated solely by the permanent magnet. This also applies to the correspondingly assigned inner magnetic field.

Figure 12:
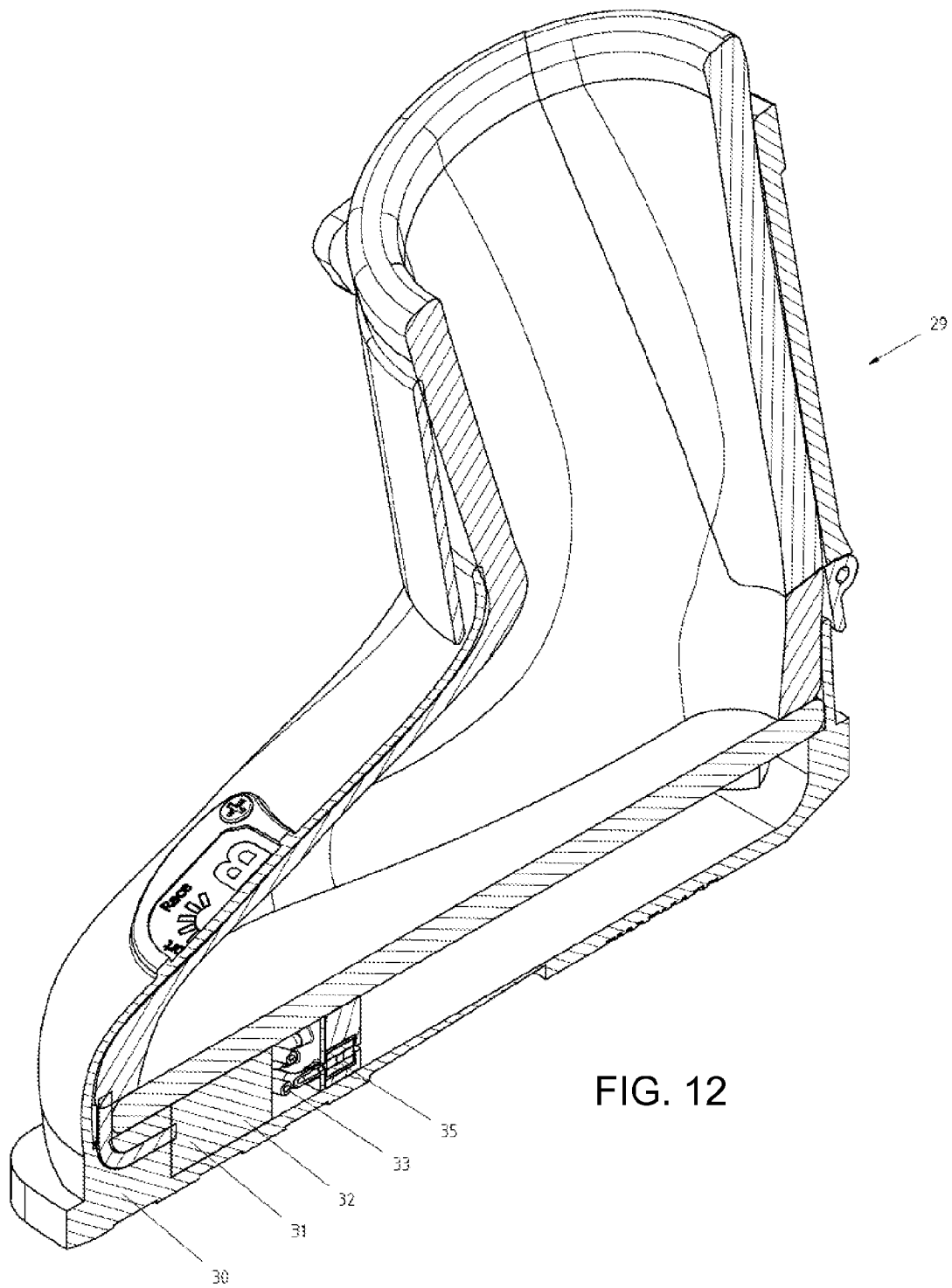
FIG. 12 shows a simplified exemplary embodiment with an example of the installation of a valve according to the invention

FIG. 12 shows, as an exemplary embodiment, the installation of the control valve 35 according to the invention in a ski shoe 29. It can be seen, here, that the control valve 35 is installed in the sole plate 30 of the ski shoe 29, and in this case a small simple current source 31, consisting, for example, of two AA batteries, is installed in the sole plate 30. Since, then, according to the invention, current is applied to the valve only for the opening state, the current source 31 has to be used only very rarely, so that, when the ski shoe is operating in the usual way, a battery service life of 1 to 2 years is afforded. Moreover, it can also be seen that the control electronics 32 and the fluid lines 33 are also arranged in the sole plate.

These fluid lines 33 lead into corresponding liquid cushions which are arranged, not illustrated in any more detail, in the ski shoe 29 and which are expanded or emptied to a greater or lesser extent according to the open or closing position of the control valve 35.

However, the invention is not restricted to the installation of the control valve 35 according to the invention. The other preferred examples of use have already been explained in the general description part. It is important that no movable parts at all are present, so that such a control valve 35 also operates even when such a ski shoe 29 is put away for more than one season, without a function being exercised in the control valve 35. The control valve therefore remains free of deposits and cannot undergo wear, which would be possible in the case of moved parts.

FIG. 13 shows, as a longitudinal section A-A in FIG. 14, the valve with nozzle-shaped contractions in the entry duct 3a and with a corresponding nozzle-shaped widening in the exit duct 4a. The entry duct 3a is in this case directed centrically onto the end face of the iron core 7, which end face thus serves as an impact surface for the inflowing liquid. This conically contracting entry duct/nozzle increases the effectiveness of the valve, that is to say, in the closed state, even higher pressures can be controlled perfectly well.

The effect due to the contraction is similar to the effect when sand is pressed through a funnel. Depending on the nozzle angle, the sand passes easily or with difficulty through the funnel, or a high force at the nozzle entrance can be obtained by means of a low force at the nozzle tip. Similarly, the exit duct 4a may also be designed so as to widen conically. In another refinement, there may be provision for only the entry duct 3a to be designed as a nozzle, while the exit duct 4a is, for example, designed cylindrically, as illustrated in FIG. 8.

FIG. 14 shows the arrangement according to FIG. 13 in an end view.

Figure 15:
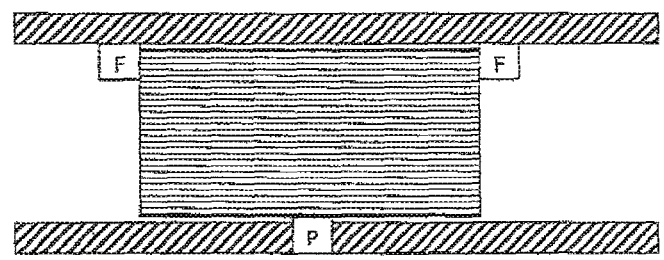
FIG. 15 shows a sensor arrangement directly on the MRL valve

FIG. 15 shows a sensor arrangement directly on the MRL valve.

The signals necessary for regulating the counterforce may be obtained, inter alia, from sensors directly on the control duct. Depending on the application and the sensor type, the sensor may be mounted, as desired, in the system.

Figure 16:
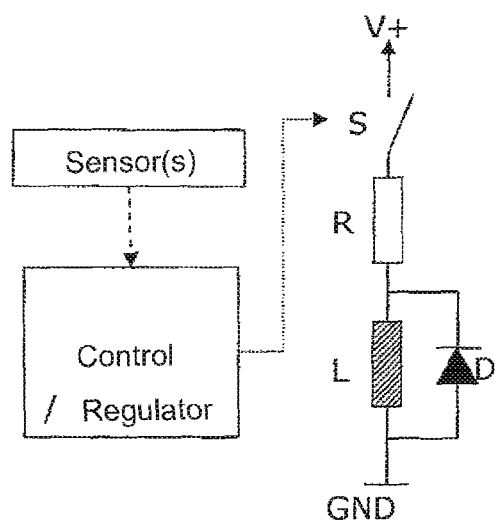
FIG. 16 shows the activation of an MRL valve by means of a simple circuit

An example of a simple activation of the MRL valve is shown in FIG. 16. When the switch S is closed, a current can flow from the supply V+ via the coil L to ground GND. The current via the coil L directly determines the strength of the magnetic field, and, in the case of pulsed activation (for example, PWM), the coil current can be varied.

In the simplest version, the switch S may be a mechanical switch/touch contact, and it is advantageous to use a transistor. However, other possibilities, such as, for example, a relay or else special forms of the transistor (MOSFET, IGBT), may also be envisaged. The switch may, inter alia, also be in the GND branch, that is to say between the coil and GND.

In a simple set-up variant, the current is limited via the resistor R. Depending on the application, the internal resistance of the current supply may even be sufficient. If the resistor is designed to be variable (potentiometer), then the coil current can also be varied. As compared with the variant activated in a pulsed manner, however, here the power loss may quickly reach very high values.

The resistor R is also intended to symbolize the possibility of current measurement. This may take place not only by measurement via a low-impedance resistor (shunt), but also by other methods, such as, for example, a current transformer of an integrated solution (current-measuring IC, Hall sensor). Current measurement may take place at any desired location in the circuit and serves for regulation.

The diode D is a recovery diode which enables the coil to continue to drive current after the opening of S. The diode may likewise be replaced by a switch which is operated in push/pull with respect to the switch S.

Figure 17:
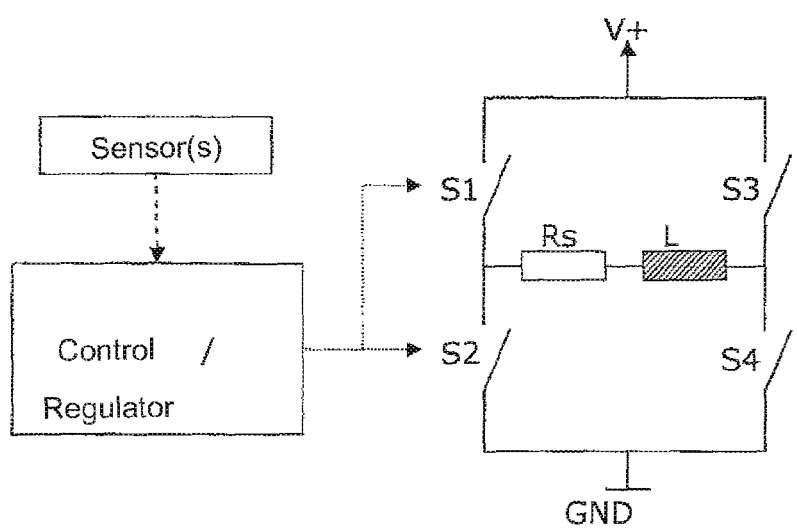
FIG. 17 shows the activation of an MRL valve by means of a full bridge circuit

An example of activation by means of a full bridge (H-bridge) is shown in FIG. 17. The coil L can thus be activated in both directions, that is to say the polarity at the coil terminals can be changed. This makes it possible, for example, to intensify or to attenuate a permanent magnet in the magnetic circuit of the coil.

The resistor Rs is intended to symbolize the possibility of current measurement. This may take place not only by measurement via a shunt, but also by other methods, such as, for example, a current transformer or an integrated solution (current-measuring IC, Hall sensor). The location of current measurement may vary, but it is advantageous, for example, to carry out measurement in the GND branch in order to obtain a GND-referenced measurement signal. Inter alia, double measurement, for example upstream of S2 and upstream of S4, may also afford advantages, since the current in each half-bridge branch is thereby measured (fault detection).

In the versions explained below, a magnetorheological fluid and a device for generating a variable magnetic field may likewise be provided for adjustable movement damping. A vibration damper or shock absorber is thereby implemented.

Figure 18:
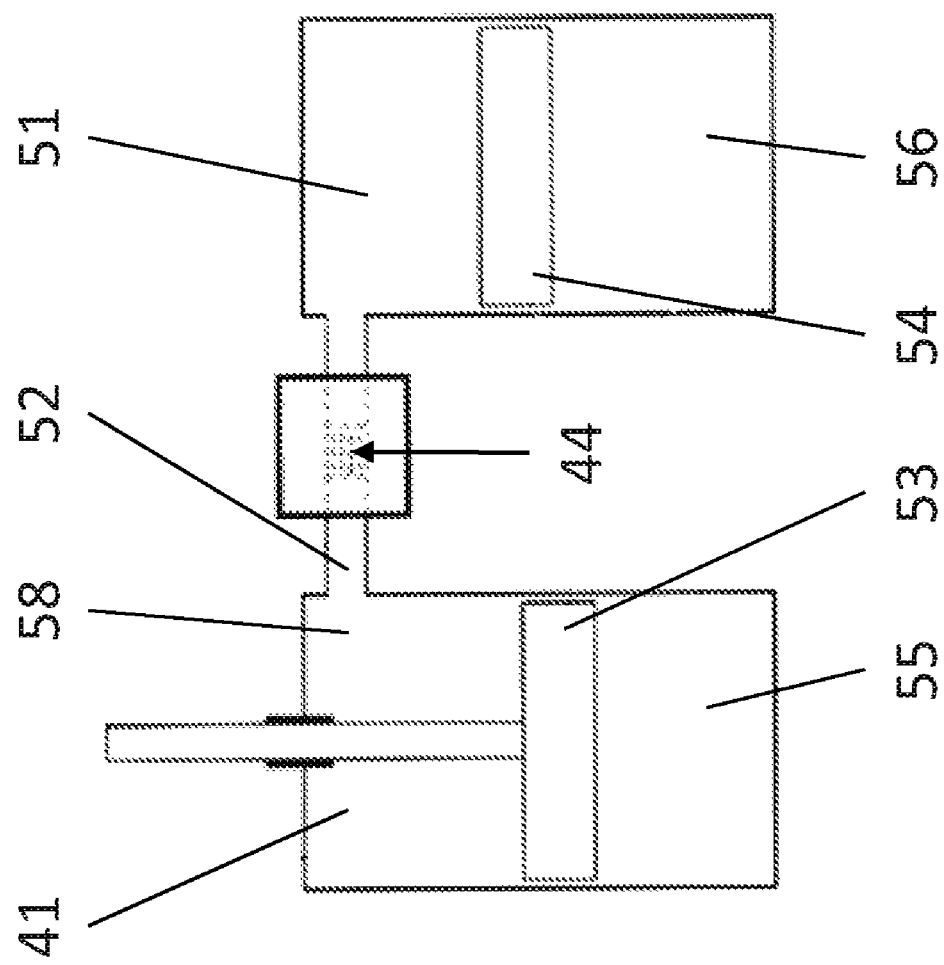
FIG. 18 shows a diagrammatic illustration of the use of an MRL valve as vibration damper with installed fans

A movement-damping device, as shown in FIG. 18, may be provided, for example, on a rear wheel swing arm suspension of a bicycle, a container 41 containing a piston 53 fixed to the frame of the bicycle by means of a piston rod. A liquid 58, for example a magnetorheological fluid, is introduced in the container 41 above the piston. Below the piston 53 is arranged a spring or an air or gas charge 55 acting as a spring. Further, the rear wheel swing arm suspension has fixed to it an compensating tank 51, into which the liquid can be displaced out of the container 41 via the connecting line 52. The equalizing tank contains a piston 54 and, below the piston 54, likewise a spring or an air or gas charge 56 acting as a spring. In the connecting line 52, a narrow 44 is provided, which generates a counterforce against the liquid flowing over, so that damping takes place. The narrow 44 is in this case, in the context of the present invention, designed as a device for generating a variable magnetic field.

Figure 19:
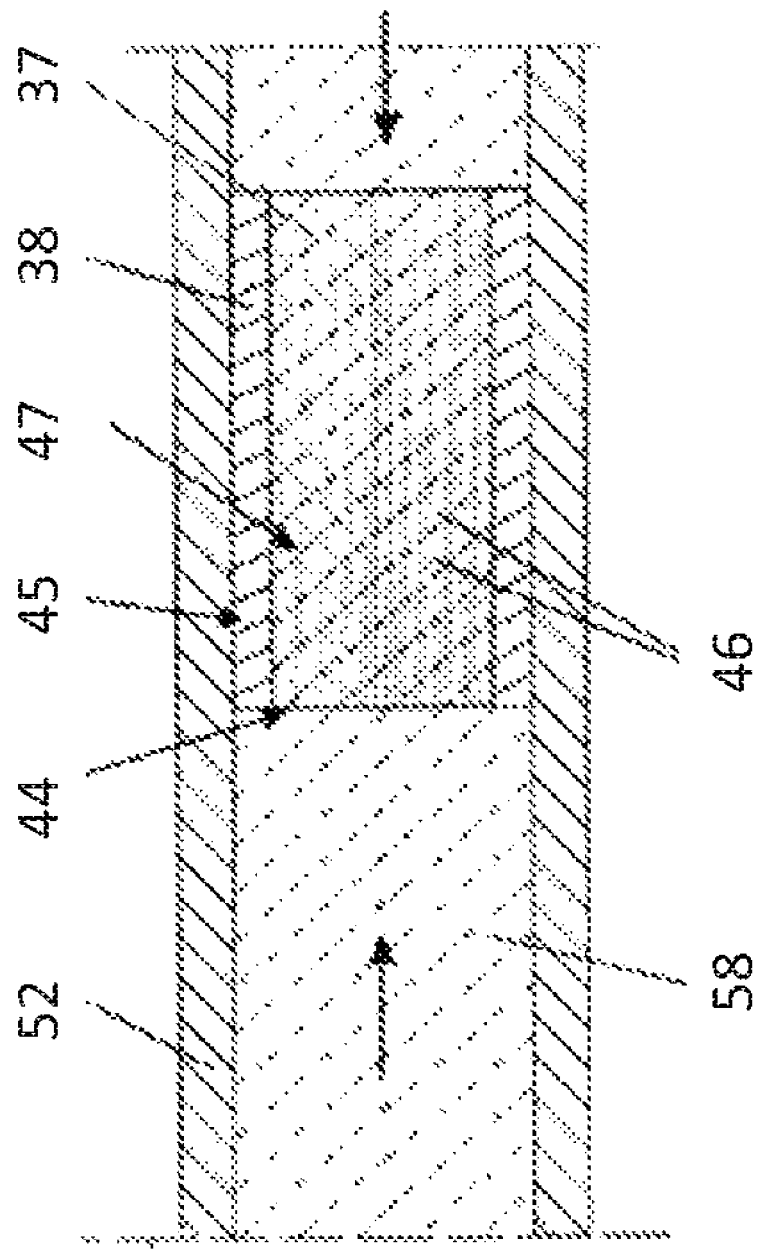
FIG. 19 shows a longitudinal section through the connecting line in FIG. 18

FIG. 19 shows, as a detail, an enlargement of the installation of the narrow 44 in the line cross section of the line 52.

The narrow 44 is formed by a bundle 47, inserted into the flow zone 45, of planar partitions 37, between which a multiplicity of flow paths 46 remain. If the flow zone 45 is encased by a cylindrical tube which constitutes part of the line 52, an upper and a lower element 38 in the form of a segment of a circle is attached to the bundle 47 of partitions 37 and bears in each case against the inside of the line 52. The planar partitions 37 have in each case two additional frictional surfaces for the liquid which give rise in the flow zone to a very high flow resistance over a short length.

Figure 20:
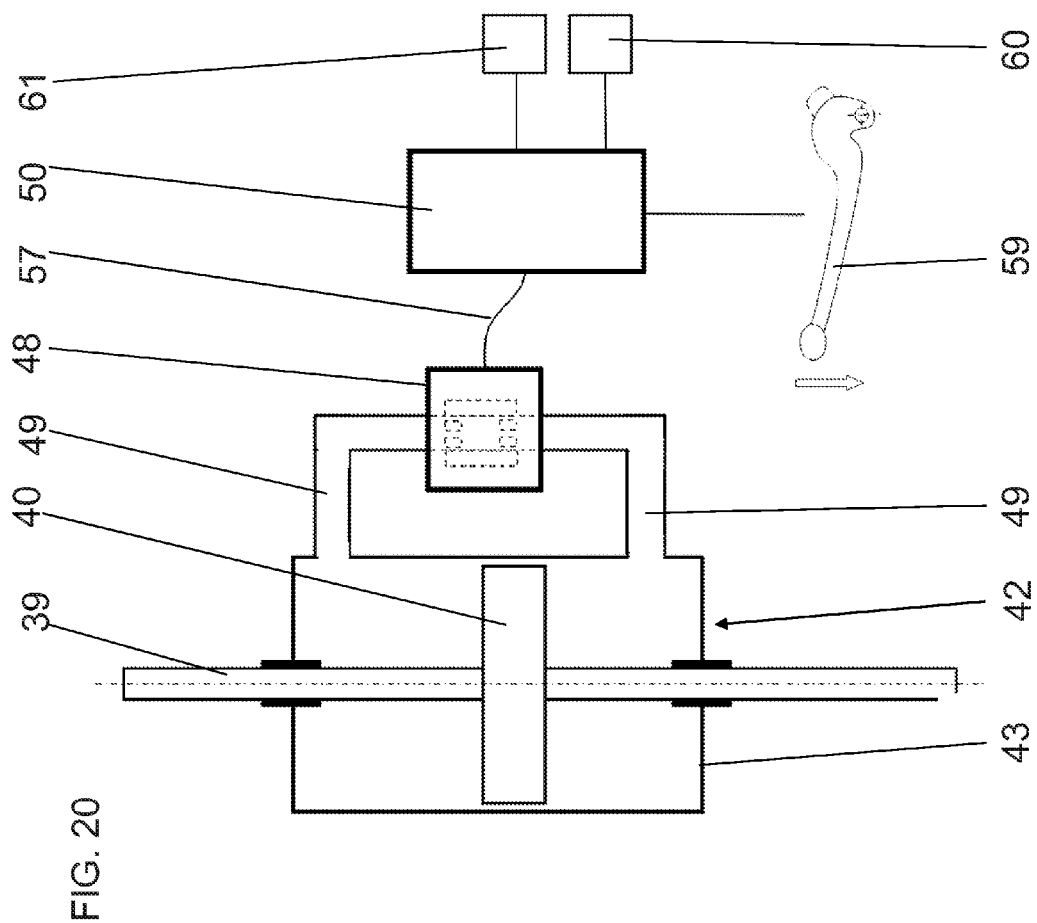
FIG. 20 shows an example of the use of the arrangement in an "antidive" system for a front wheel fork of a bicycle

FIG. 20 illustrates diagrammatically an example of the use of the device according to the invention in an "antidive" system for a front wheel fork of a bicycle.

The piston/cylinder unit 42 has a cylinder 43 and a piston 40, and the continuous piston rod 39 is arranged, for example, so that it is co-moved with the wheel hub or the wheel, while the cylinder 43 is arranged so that it is connected to the fork bridge of the front wheel fork of the bicycle. Thus, during the jouncing of the front wheel fork, the piston 40 moves in the cylinder 43. In this case, the magnetorheological fluid which is located in the cylinder 43 is moved by the controllable damping device 48 according to the invention, specifically via the duct 49.

The damping device 48 according to the invention may, for example, be designed as shown in FIG. 18 or 19. The coil, not illustrated in any more detail, via which the magnetic field and consequently the damping action can be set, is supplied with current via a line 57 from a central electronic control unit 50.

When the front wheel brake lever 59, illustrated diagrammatically, is pulled, the electronic control unit 50 can increase the flow of current to the coil. Consequently, the magnetic field and, ultimately, also the damping action are increased. What is thereby achieved, overall, is that the plunge of the front wheel fork during braking is reduced (antidive system). The electronic control device 50 may also be controlled as a function of further sensors 60 for the speed and 61 for, for example, the detected outside temperature or a uniaxial or multiaxial acceleration sensor.

Figure 21:
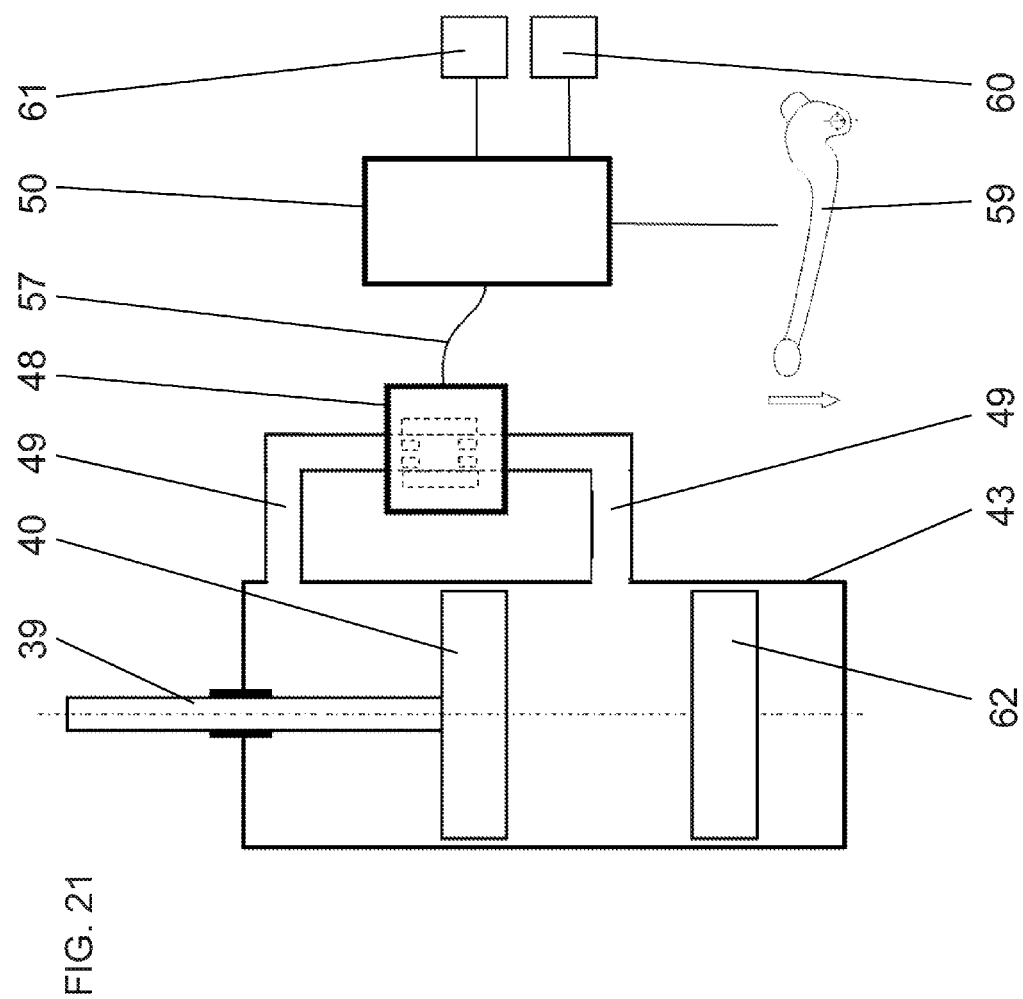
FIG. 21 shows an exemplary embodiment which is modified in relation to FIG. 20
Figure 22:
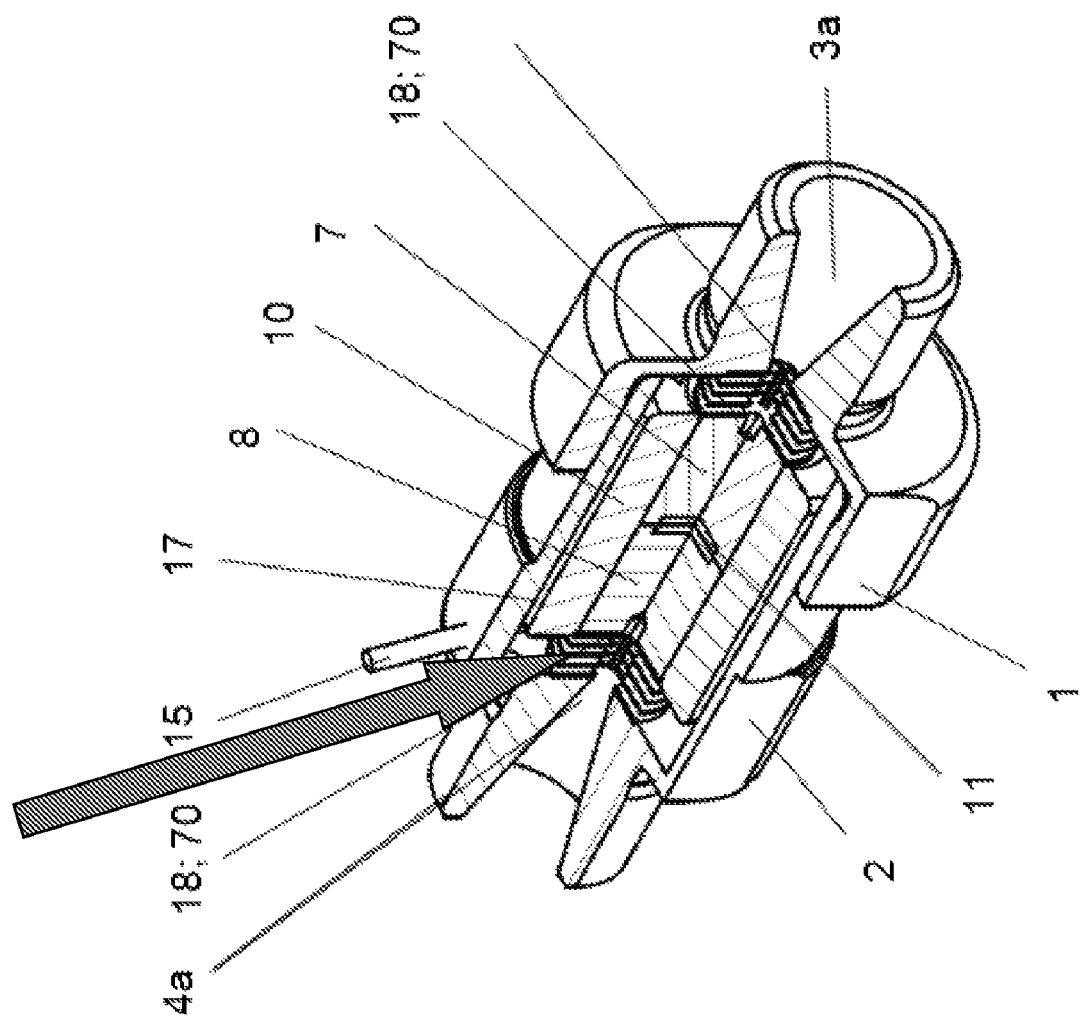
FIG. 22 shows an MRL valve with a fan in the control duct
Figure 24:
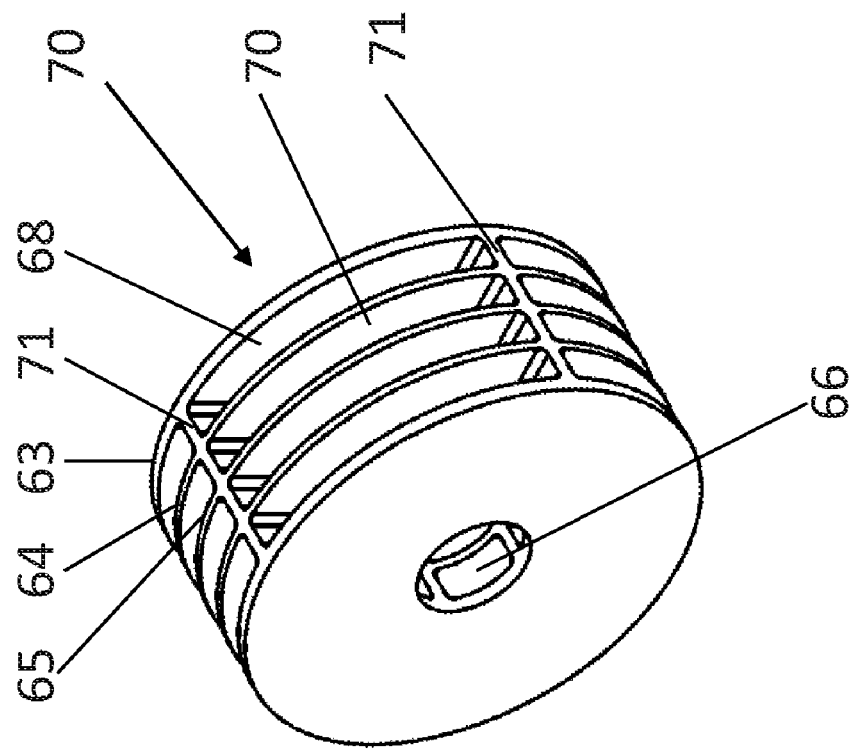
FIG. 24 shows the fan according to FIG. 23 in a perspective rear view
Figure 23:
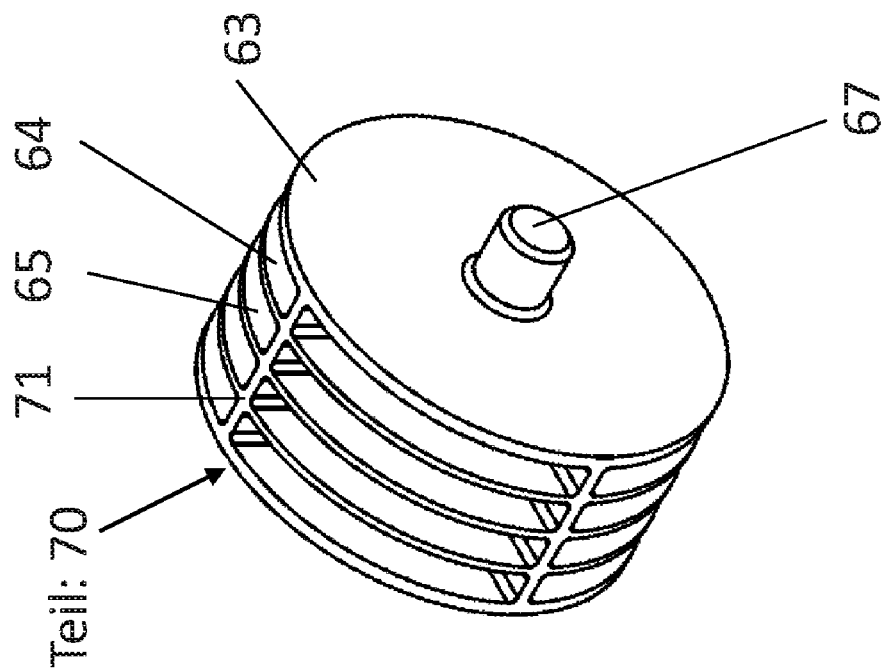
FIG. 23 shows the fan according to FIG. 22 in a perspective front view

The exemplary embodiment shown in FIG. 21 differs from that in FIG. 20 essentially in that the piston rod 39 is not continuous. If the piston rod 39 were to plunge into the cylinder 43, therefore, the volume of the magnetorheological fluid would have to decrease. However, since liquids are virtually incompressible, a compensating element 62 is provided for this purpose. This may be formed, for example, by an air-filled absorber foam having closed pores. It is also possible, however, that the part 62 is formed by a piston which closes off sealingly and that the space below the piston is gas-filled or air-filled, in order to compensate the plunge of the piston rod volume.

FIGS. 22 to 25 illustrate the use of a fan 70 in the control duct of an MRL valve according to the invention. The fan 70 used in each case on the entry side and on the exit side increases the frictional surface for the flow of the magnetorheological fluid when it flows through the duct.

The liquid consequently not only flows through a single duct, but through a control duct fanned open via a plurality of axial layers arranged parallel to one another. Consequently, the force difference (spread) between the switched-on and switched-off state of the valve is increased. A single duct 18 is consequently subdivided into a plurality of ducts. The fan 70 is a completely rotationally symmetrical part consisting of a plurality of disks 63-65 which are arranged one behind the other and which are separated from one another and spaced apart by webs 71 arranged between them.

Figure 25:
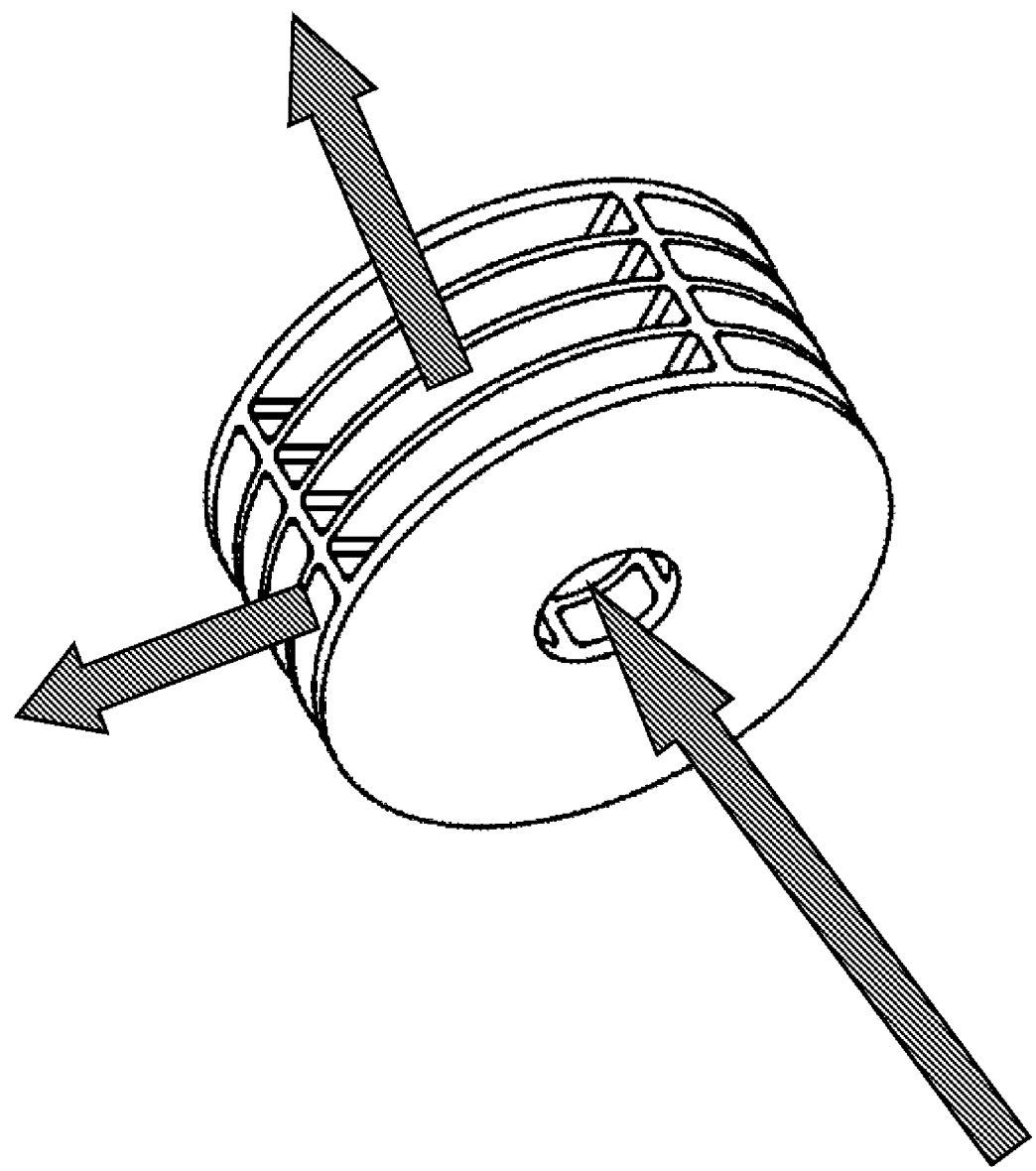
FIG. 25 shows the fan according to FIGS. 23 and 24 with an illustration of the liquid flow

Thus, starting from a central inflow orifice 66, the liquid first flows in the axial direction into the fan 70 and is then distributed outwardly into the individual radial ducts 68, 69, as illustrated in FIG. 25. The rest of the liquid which has not been deflected in the radial direction passes as far as the end-face closure 67 on the other side.

It is in this case preferable if the individual disks 63-65 arranged axially one behind the other are formed from a magnetically conductive material, while the webs 71 lying between them consist of a magnetically non-conductive material. The magnetic flux is not to be short-circuited there.

In another refinement of the invention, however, there may be provision for forming the webs 71, too, from a magnetically conductive material. The production of the fan 70 is consequently simpler, because all the parts consist of a magnetically conductive material. The magnetic losses occurring thereby in the region of the webs 71 are still acceptable.

The installation of the fan according to the invention for flow distribution in the control duct 18 has major advantages. Thus, it was found that, in an MRL valve without fans used, forces and counterforces in the range of between 1000 and 3000 newton can be switched. If the valve is switched off and is not live, a counterforce of 1000 newton is present, but, when it is live, a counterforce of 3000 newton is generated in the liquid. Pressures in the range of 30 to 60 bar can consequently be switched.

By contrast, when the fans 70 according to the invention are used in the MRL valve according to the invention, 6000 to 8000 newton can be switched by means of the same electromagnet. Converted into pressure, this corresponds to a 300 to 400 bar shut-off capacity of the valve.

To explain this phenomenon, it can be stated that the MRL particles (carbonyl iron powder particles) are initially present, unordered, in the liquid when there is no magnetic field. Under the influence of a magnetic field, they form a coherent chain in the magnetorheological fluid. If, then, there is a relatively large gap of the length of, for example, 6 mm in the control duct 18 without the use of a fan 70, there is the risk that such a long chain of particles in the liquid breaks apart.

If, by contrast, the control duct is subdivided into a multiplicity of radial ducts arranged parallel to one another, the gap distance becomes smaller, and there is no longer the risk that the chain of particles attached to one another breaks apart. Consequently, the frictional surface in the region through which the magnetic field flows is also substantially increased. The particles can therefore clamp themselves on a substantially enlarged wall surface when the magnetic field is switched on, because the surface active for this purpose is enlarged by the multiplicity of disks 63-65 used.

A force higher by a multiple or a pressure difference higher by a multiple can consequently be switched by means of the same magnetic field.

Figure 27:
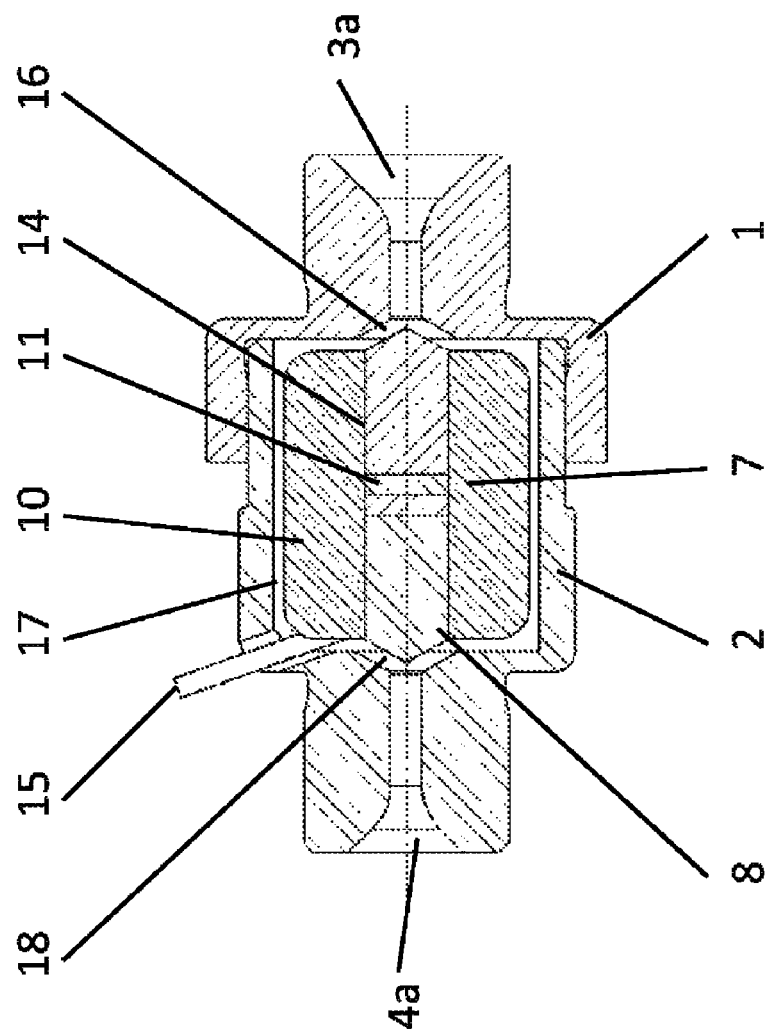
FIG. 27 shows a cross section along the line XIV in FIG. 26 with a further exemplary embodiment having flow-optimized iron cores
Figure 26:
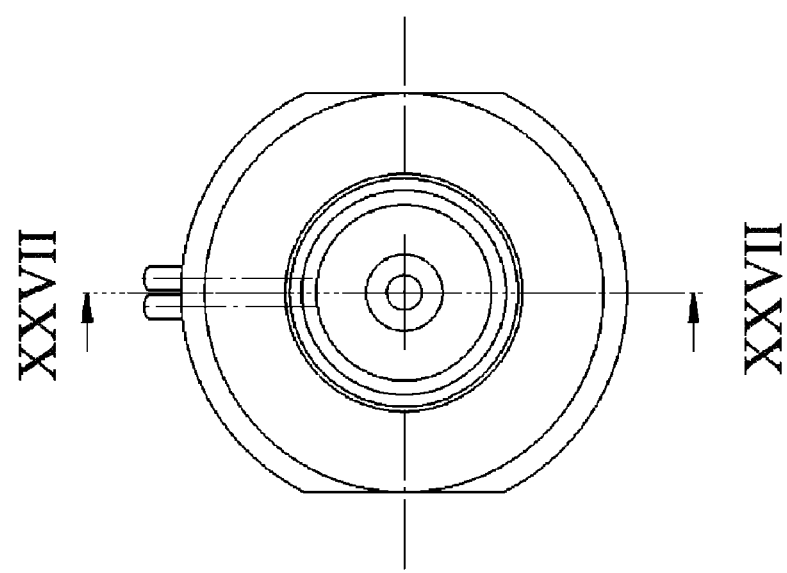
FIG. 26 shows a top view of the entry-side end face of the further exemplary embodiment according to FIG. 27

FIG. 26 shows the entry-side end view of a further exemplary embodiment. This is illustrated as a cross section in FIG. 27. In this version, the iron cores have conical ends which lower the flow resistance of the valve, this being advantageous when higher flow velocities occur. The control duct runs, in the region of the iron core, slightly obliquely with respect to the perpendicular to the throughflow direction of the valve, but essentially still radially outward.

It is also conceivable to have a flow-optimized curved profile of the control duct with correspondingly shaped iron cores and housing halves. The radially outer transition of the control duct to the annular duct is also preferably not at right angles, but rounded.

Axial bores, which are also possible in this version, in the iron cores are not depicted. Spacers are likewise not illustrated in order to keep the illustration easy to understand.

The exemplary embodiment shows a permanent magnet in the middle, enclosed by the iron cores and the coil. As illustrated clearly in FIG. 10, the magnetic circuit is formed by the magnet, the iron cores and parts of the two housing halves. Part of the control duct is also part of the magnetic circuit.

The permanent magnet may consist, for example, of AlNiCo, so that its magnetization can be varied via magnetic pulses from the coil. Energy has to be expended only for changing the magnetization, and the respective state of the valve may be kept permanently currentless.

Any desired part of the magnetic circuit may consist at least partially of hard-magnetic material, but it is advantageous if the hard-magnetic material is located within the coil, since very high and homogeneous magnetic fields can be achieved here.

Figure 28:
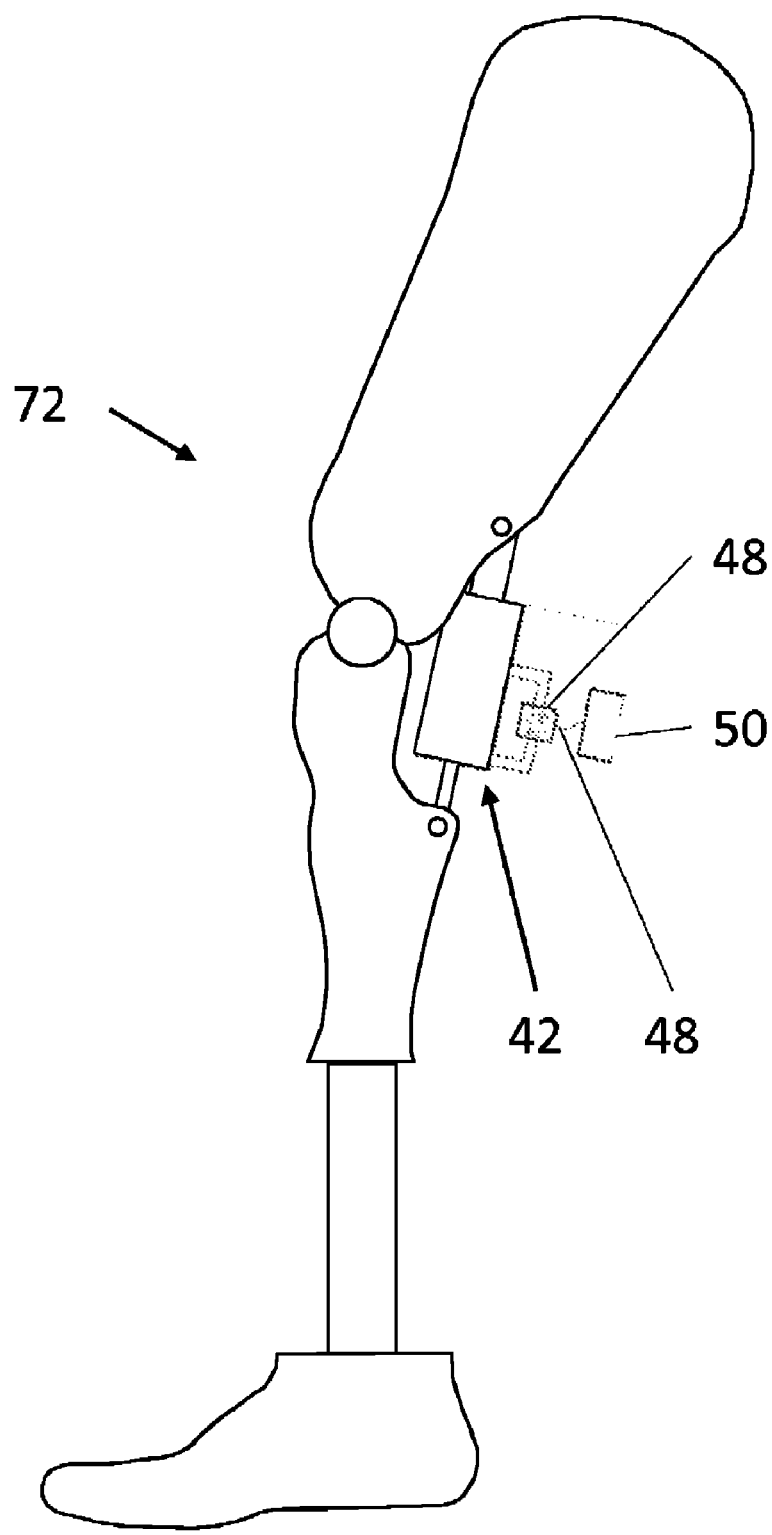
FIG. 28 shows a diagrammatic view of a damper with an MRL valve on an artificial knee joint.

FIG. 28 shows a further possible use of this invention as a damper in a leg prosthesis. In this case, the damper set-up from FIG. 21 is combined with a valve according to FIG. 27. In the valve according to FIG. 27, part of the magnetic circuit consists at least partially of hard-magnetic material, as described under point 8. Retentivity.

The piston/cylinder unit 42 has a cylinder 43 and a piston 40, and the piston rod 39 is arranged, for example, so that it is co-moved with the lower leg, while the cylinder 43 is arranged so that it is connected to the thigh. When the lower leg is bent, therefore, the piston 40 moves in the cylinder 43. In this case, the magnetorheological fluid located in the cylinder 43 is moved through the duct 49 of the controllable damping device 48 according to the invention.

The coil, not illustrated in any more detail, via which the magnetic field and consequently the damping action can be set, is supplied with current via a line 57 from a central electronic control unit 50. Sensors deliver the basic data for the movement of the prosthesis.

In this prosthesis, the magnetic field of the valve can be generated permanently by means of a magnetic device consisting at least partially of hard-magnetic material. In this case, the magnetization of the hard-magnetic material may be varied permanently by means of at least one magnetic pulse from the coil, in order to vary permanently the magnetic field acting in the control duct and consequently the flow resistance of the valve. This is advantageous when longer-lasting operating states with invariable damping, such as, for example, even walking over lengthy distances, occur. For this purpose, the valve does not require energy permanently, thus greatly increasing the possible overall utilization time. Nevertheless, the valve reacts in the millisecond range to desired changes, so that this fixing of the magnetic field by means of retentivity is not detrimental to the comfort of the prosthesis wearer.

LIST OF REFERENCE NUMERALS

1 Housing half
2 Housing half
3 Connection piece
3*a* Entry duct
4 Connection piece
4*a* Exit duct
5 Direction of arrow
6 Direction of arrow
7 Iron core
8 Iron core
9 Spacer
10 Coil
11 Permanent magnet
12 North pole
13 South pole
14 Inner bore
15 Coil connection
16 Control duct
17 Annular duct
18 Control duct
19 Axial bore
20 External thread
21 Internal thread
22, 22' Outer magnetic flux
23 Inner magnetic field
24, 24' Magnetic flux (reduced)
25 Resultant magnetic field
26 Residual field
27 Position
28 Position
29 Ski shoe
31 Current source
32 Control electronics
33 Fluid line
34 Center line
35 Control valve
36 Directions of arrows
37 Partitions
38 Element in the form of a segment of a circle
39 Piston rod
40 Piston
41 Container
42 Piston/cylinder unit
43 Cylinder
44 Narrow
45 Flow zone
46 Flow path
47 Bundle
48 Damping device
49 Duct
50 Control unit 51 Compensating tank
52 Connecting line
53 Piston
54 Piston
55 Gas charge
56 Gas charge
57 Line
58 Liquid
59 Brake lever
30 Sole plate
60 Sensor
61 Sensor
62 Compensating element
63 Disk
64 Disk
65 Disk
66 Inflow orifice
67 Closure
68 Radial duct
69 „""
70 Fan
71 Web
72 Leg prosthesis

The invention claimed is:

1. A valve for a magnetorheological fluid, comprising:
a duct formed in the valve for conducting the fluid through the valve;
a coil disposed to have a current pass therethrough and to influence a viscosity or to cause a change in a flow resistance of the fluid in dependence on the current in said coil and to selectively open and close said duct, said coil having a radially outer circumference, an end-face region, an inner space, and an axial center line;
a permanent magnet disposed in said inner space of said coil;
said duct being formed partially in said end-face region of said coil and partially extending over said radially outer circumference of said coil as an annular duct;
said duct being formed in said end-face region of said coil as a disk-shaped control duct configured to conduct the fluid radially with respect to said axial center line of said coil; and
a housing with two halves enabling a flow cross section of said control duct to be continuously variable.

2. The valve according to claim 1, which further comprises an iron core disposed in said inner space of said coil, said iron core having a bore formed therein in a region of said axial center line of said coil, said bore acting as a flux line concentrator for increasing a density of the flux lines radially outward with respect to said axial center line of the valve in said disk-shaped control duct.

3. The valve according to claim 1, which comprises at least one disk element or fan element disposed in said disk-shaped control duct for subdividing said disk-shaped control duct into a plurality of control ducts.

4. The valve according to claim 3, wherein said disk or fan elements consist of a plurality of axially positioned magnetically conductive strips spaced apart from one another by way of magnetically non-conductive webs.

5. The valve according to claim 1, which comprises said housing of two housing halves with connection pieces disposed thereon forming an entry duct and an exit duct for the inflow and outflow of the magnetorheological fluid, said housing halves being magnetically conductive and positively connectible to one another.

6. The valve according to claim 1, which comprises spacers formed from a magnetically non-conductive material and supported with bent ends thereof in each case on an inner surfaces of said two housing halves and forming a defined control duct penetrating said spacers.

7. The valve according to claim 1, which comprises iron cores inside said coil and wherein a fluid duct defined in the valve region is delimited inwardly by end faces of said iron cores and by said end faces and said radially outer circumference of the coil, and outwardly by an inner circumference of said housing.

8. The valve according to claim 1, wherein a longitudinal axis of said duct is oriented in a radial direction relative to the axial center line, an annular duct adjoining a radially outer end of said duct, said annular duct surrounding said radial circumference of said coil and forming a fluid jacket for cooling the coil and ensuring an electrical resistance to remain constant.

9. The valve according to claim 1, wherein said coil, in an energized state thereof, generates an outer and an inner magnetic flux and counteracts a magnetic flux of said permanent magnet, thereby causing a magnetic flux having a relatively low density of magnetic flux lines to be formed in a region of said control ducts, and the magnetic flux bringing about a relatively low viscosity of the fluid, and, accordingly, for the control valves to open and the fluid to flow.

10. The valve according to claim 1, wherein said permanent magnet generates a relatively high magnetic flux through said control ducts, whereby a viscosity of the fluid is increased and a throughflow of the fluid is prevented.

11. The valve according to claim 1, which comprises an entry duct conducting the fluid into said control duct, said entry duct contracting to form a nozzle.

12. The valve according to claim 1, wherein the fluid is discharged from the control duct through an outlet duct widened conically outward.

13. The valve according to claim 1, wherein said permanent magnet has no direct contact with, and is spaced apart from, the flow duct and the fluid.

14. The valve according to claim 1, which comprises a heating element connected to a temperature-dependent resistor, wherein a current through said heating element can be adapted automatically to a temperature.

15. The valve according to claim 1, which comprises at least one pressure sensor and/or one volume flow meter disposed in said flow duct.

16. The valve according to claim 1, which comprises one or more disk or fan elements disposed in said control duct.

17. A shoe implement, comprising:
a shell forming a shoe;
at least one valve according to claim 1 installed in said shell and energized in an opening state by way of a current source;
control electronics and fluid lines communicating with and issuing into fluid cushions disposed in said shell, said fluid cushions being selectively expanded or emptied in accordance with an open or a closed position of said control valve.

18. In combination with a bicycle, a movement-damping device having a valve according to claim 1 disposed in a rear wheel swing arm suspension of the bicycle or on a front wheel fork of the bicycle.

19. The valve according to claim 1, wherein said control duct extends substantially radially with respect to said axial center line and is slightly inclined in relation to a plane perpendicular to the center line.

20. The valve according to claim 1, wherein a magnetic circuit is formed with said iron core and said permanent magnet, and wherein at least a portion of said magnetic circuit has hard-magnetic properties, with a material being deemed hard-magnetic when a coercive field strength thereof lies above 1 kA/m ($1 \times 10^3$ ampere/meter).

21. The valve according to claim 1, wherein a magnetic circuit is formed with said iron core and wherein at least part of the magnetic circuit has hard-magnetic properties, with a material being deemed hard-magnetic when a coercive field strength thereof lies above 1 kA/m, in order to render superfluous a permanent magnet.

22. The valve according to claim 21, wherein a magnetization of the hard-magnetic material is permanently varied by way of at least one magnetic pulse from said coil.

23. The valve according to claim 21, wherein a magnetization of the hard-magnetic material is completely canceled or at least attenuated by way of a magnetic alternating field of the coil.

24. The valve according to claim 21, wherein a magnetization of the hard-magnetic material may assume any desired value, defined by a pulse, between 0 and a residual magnetism of the material by way of at least one magnetic pulse from said coil.

25. The valve according to claim 21, wherein a magnetization of the hard-magnetic material may have a polarity thereof reversed by way of at least one magnetic pulse from said coil.

26. The valve according to claim 1, which comprises a current source storing an energy for at least one magnetic pulse of said coil.

27. A valve for a magnetorheological fluid, comprising:
- a flow duct formed in the valve for conducting the fluid through the valve;
- a coil disposed to have a current pass therethrough and generated a magnetic field influencing a viscosity and a flow resistance of the fluid in said duct;
- a magnetic circuit formed of a housing, iron cores in said housing, and a permanent magnet, said magnetic circuit being at least partially formed of a hard-magnetic material;
- wherein a magnetization of at least part of said magnetic circuit may be permanently varied by way of at least one magnetic pulse from said coil, by permanently varying a magnetic field acting in said flow duct and a flow resistance in said flow duct; and
- a housing with two halves enabling a flow cross section of said control duct to be continuously variable.

* * * * *

UNITED STATES PATENT AND TRADEMARK OFFICE
CERTIFICATE OF CORRECTION

PATENT NO. : 8,302,327 B2  
APPLICATION NO. : 12/726881  
DATED : November 6, 2012  
INVENTOR(S) : Stefan Battlogg Page 1 of 1

It is certified that error appears in the above-identified patent and that said Letters Patent is hereby corrected as shown below:

On the Title Page, Item (63) should read

Related U.S. Application Data

(63) Continuation-In-Part of application No. PCT/EP2008/007929, filed on Sep. 19, 2008.

Signed and Sealed this  
Thirty-first Day of May, 2016

Michelle K. Lee  
*Director of the United States Patent and Trademark Office*